US009385883B2

(12) United States Patent
Lu

(10) Patent No.: US 9,385,883 B2
(45) Date of Patent: Jul. 5, 2016

(54) DAISY CHAIN DEVICES AND SYSTEMS FOR DIGITAL SIGNAL SWITCHING AND DISTRIBUTION

(75) Inventor: Xiaozheng Lu, Irvine, CA (US)

(73) Assignee: Luxi Electronics Corp., Irvine, CA (US)

( * ) Notice: Subject to any disclaimer, the term of this patent is extended or adjusted under 35 U.S.C. 154(b) by 931 days.

(21) Appl. No.: 13/487,040

(22) Filed: Jun. 1, 2012

(65) Prior Publication Data

US 2013/0061271 A1 Mar. 7, 2013

Related U.S. Application Data

(60) Provisional application No. 61/492,546, filed on Jun. 2, 2011.

(51) Int. Cl.
*H04L 12/28* (2006.01)
*H04N 21/436* (2011.01)

(52) U.S. Cl.
CPC ...... *H04L 12/2838* (2013.01); *H04N 21/43615* (2013.01); *H04L 2012/2849* (2013.01)

(58) Field of Classification Search
CPC .............................................. H04N 21/43615

USPC ....................................................... 725/74, 78
See application file for complete search history.

(56) References Cited

U.S. PATENT DOCUMENTS

| 2009/0119736 | A1* | 5/2009  | Perlman et al. ............... 725/133 |
| 2010/0073483 | A1  | 3/2010  | Squillante et al. |
| 2010/0142723 | A1* | 6/2010  | Bucklen ......................... 381/81 |
| 2011/0274008 | A1* | 11/2011 | Lida .............................. 370/254 |
| 2011/0317587 | A1* | 12/2011 | Lida et al. ..................... 370/254 |
| 2012/0062800 | A1  | 3/2012  | Sisto et al. |

OTHER PUBLICATIONS

Extron VSW 2VGA A Two Input VGA-2XGA and Stereo Audio Switcher, 2005.
Extron 2VGA A CAtalog page, 2005.

* cited by examiner

*Primary Examiner* — Olugbenga Idowu
(74) *Attorney, Agent, or Firm* — Jonathan A Claypool

(57) ABSTRACT

The invention provides systems, devices, methods and software to daisy chain multiple individual transmitters, optionally nodes, optionally extenders, and receivers to form any sized scalable system of digital video and audio signal switching and distribution. The video audio systems are for a simpler system design, wiring, control and expansion, to accomplish signal interfacing, switching, splitting for many varied input and output requirements with a scalable pair of transmitters and receivers.

23 Claims, 27 Drawing Sheets

Prior Art Matrix Switcher

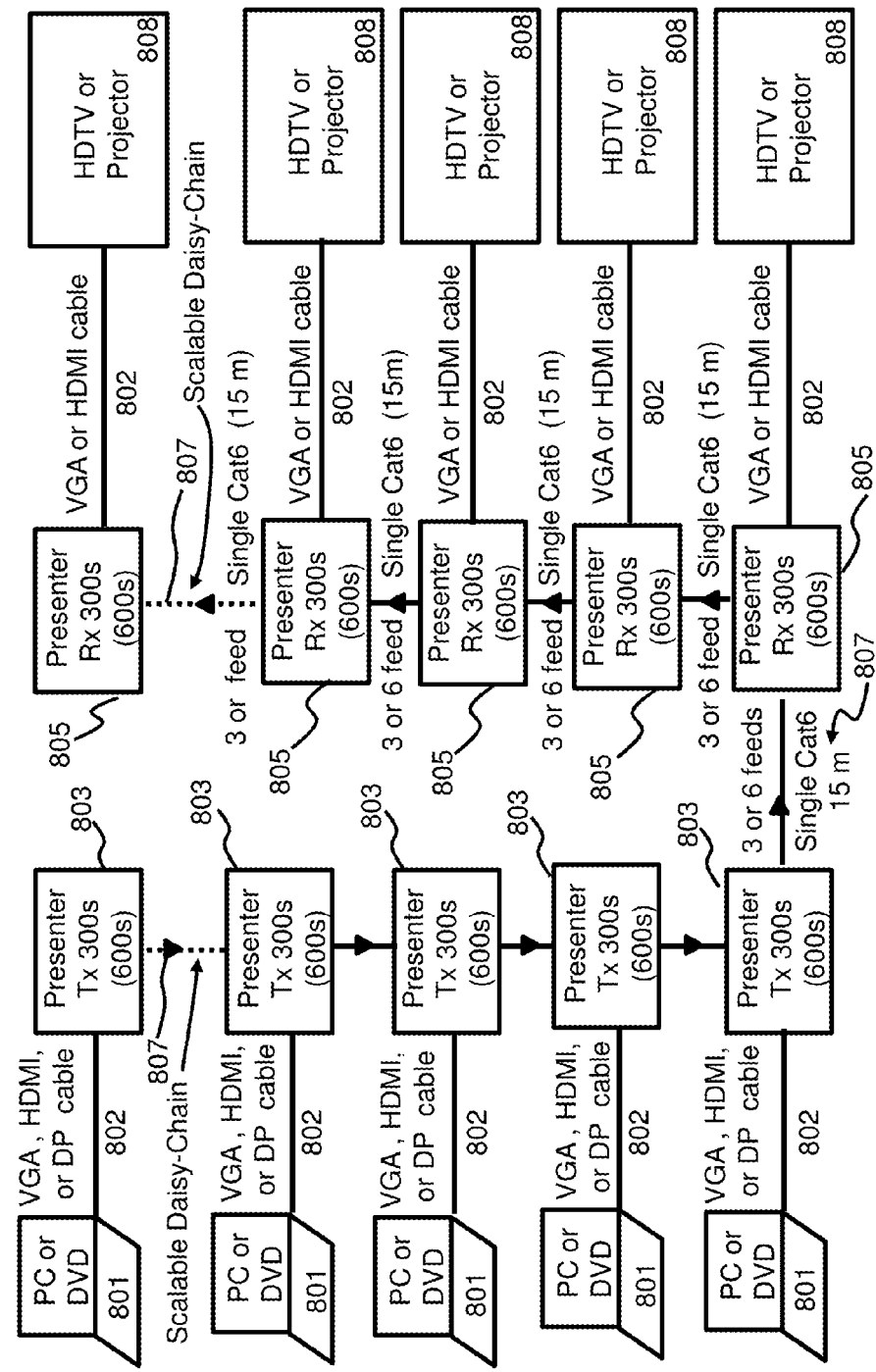

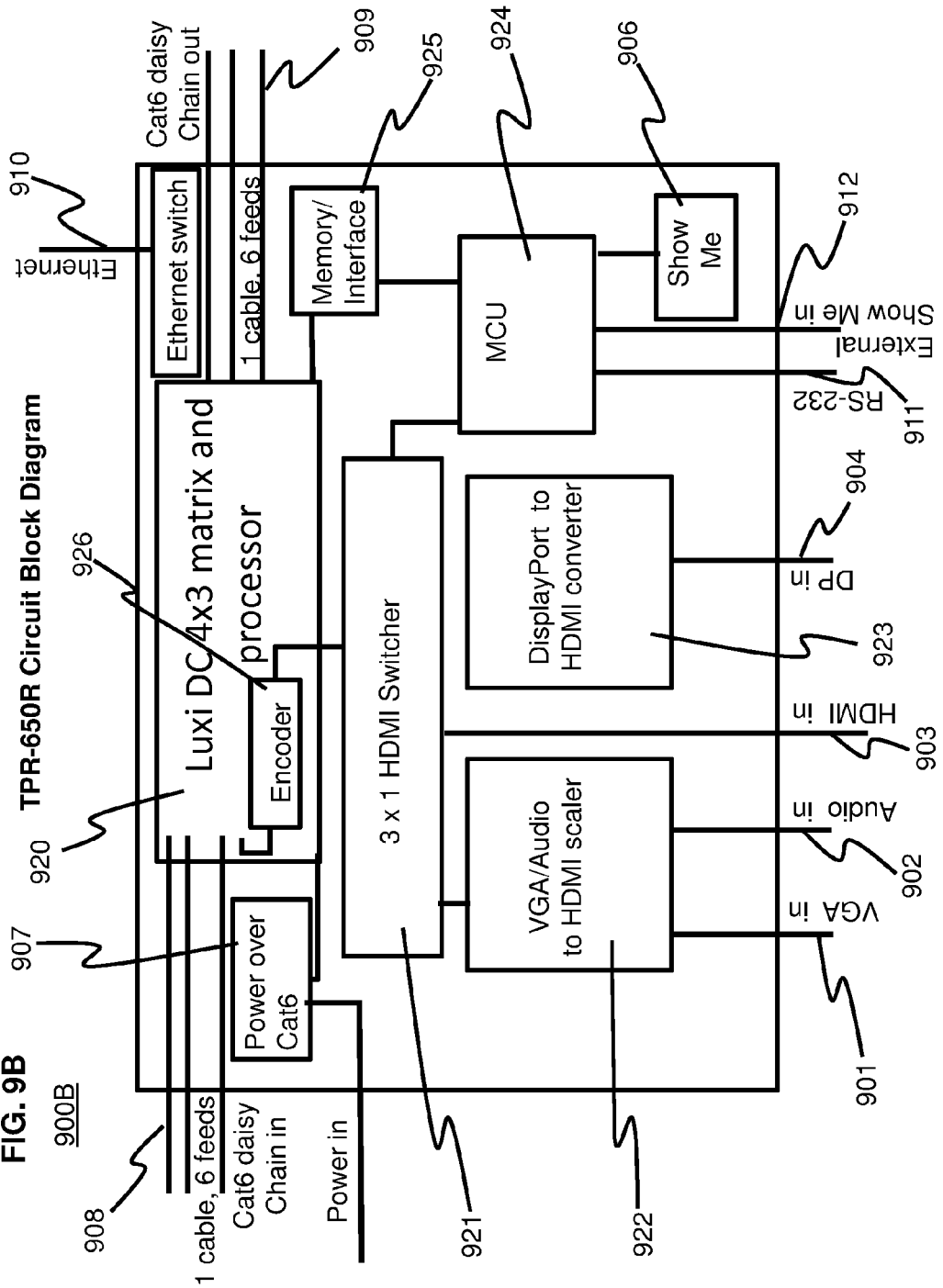

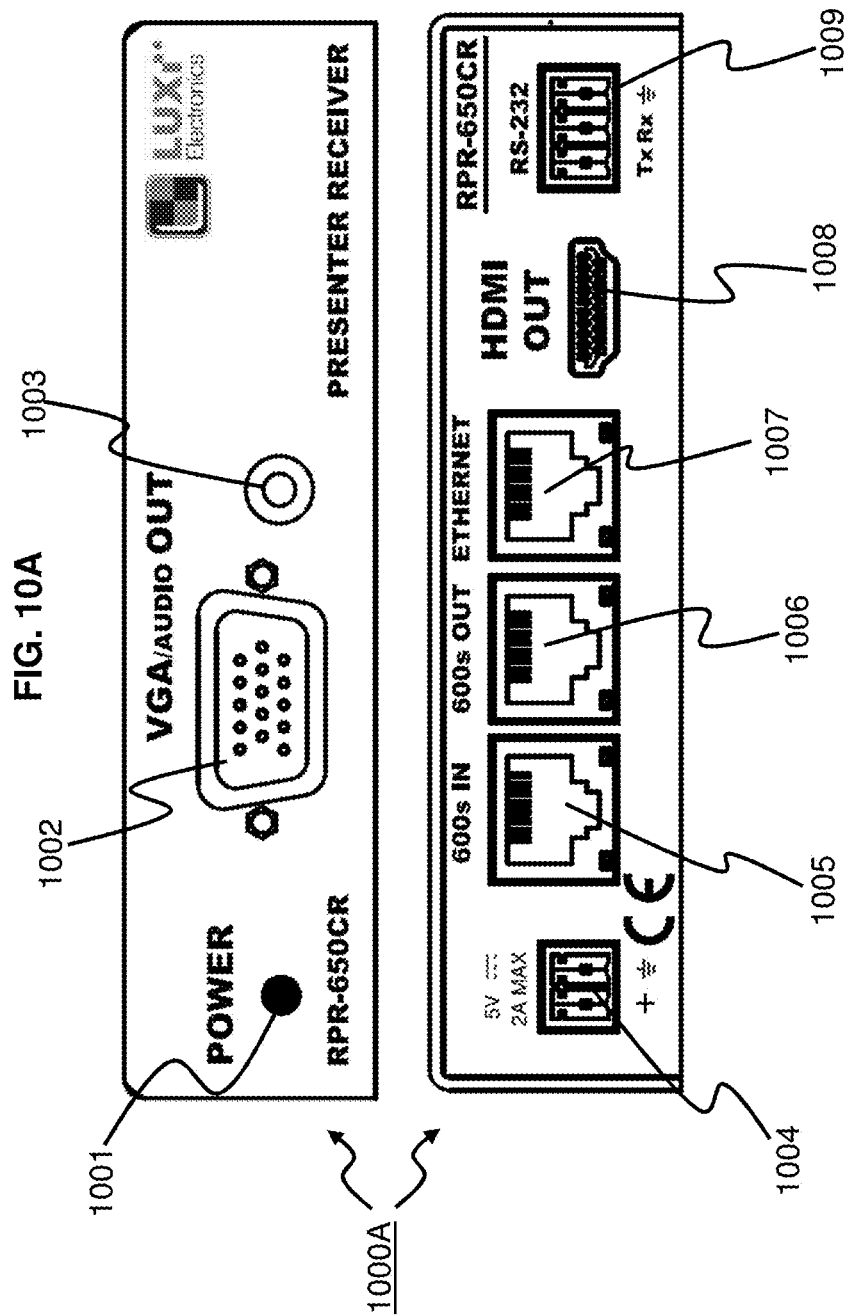

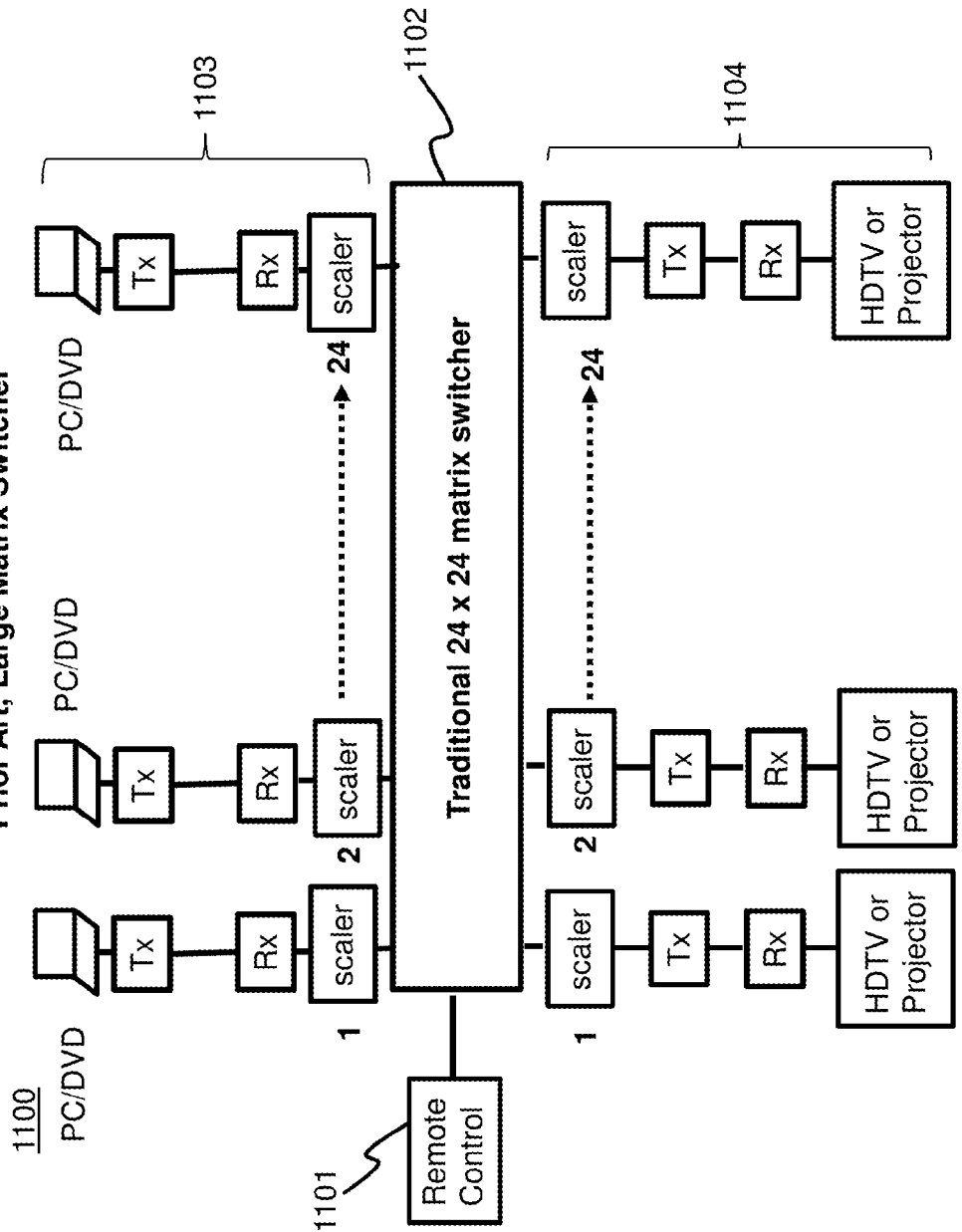

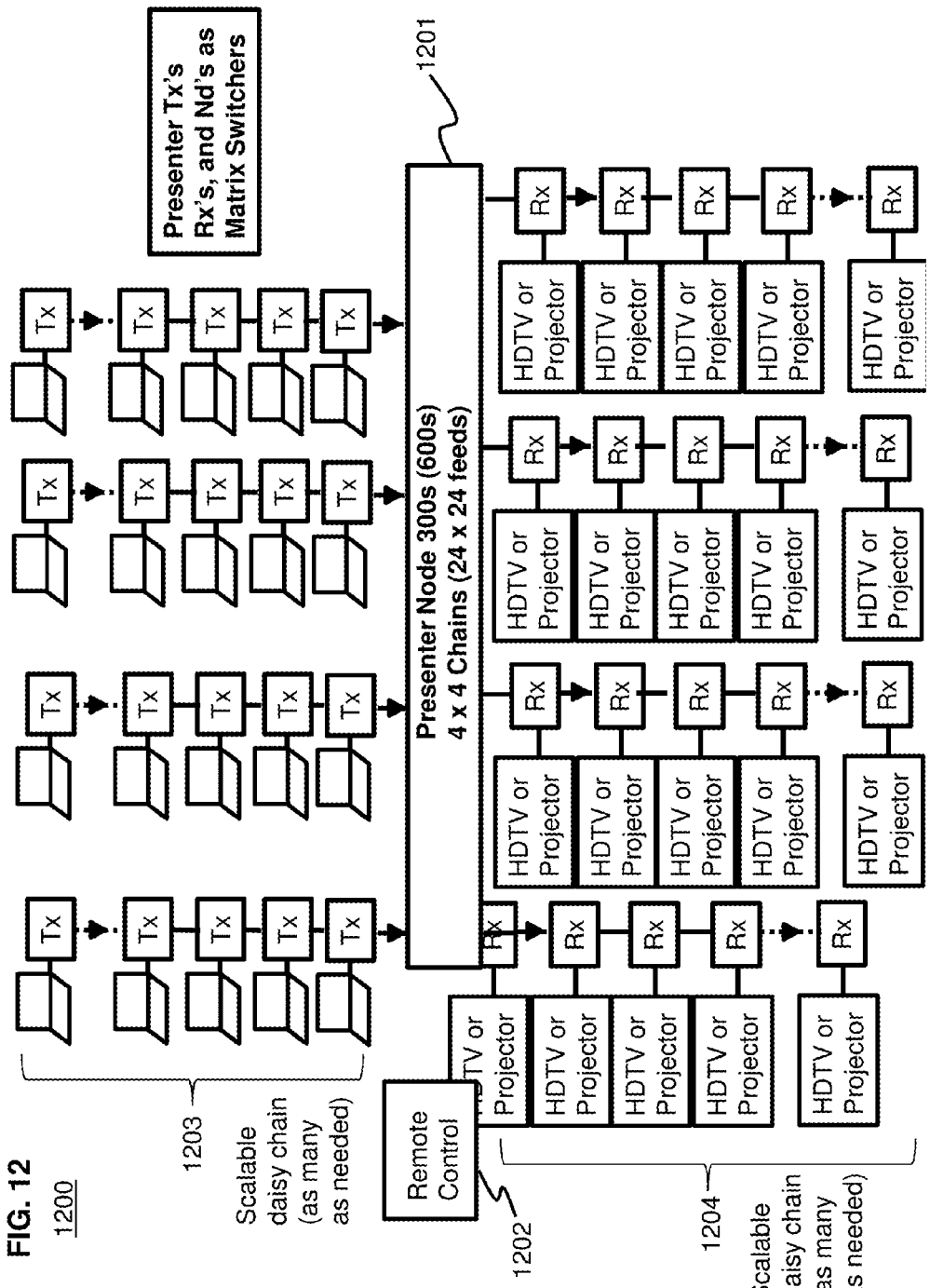

Prior Art Extender

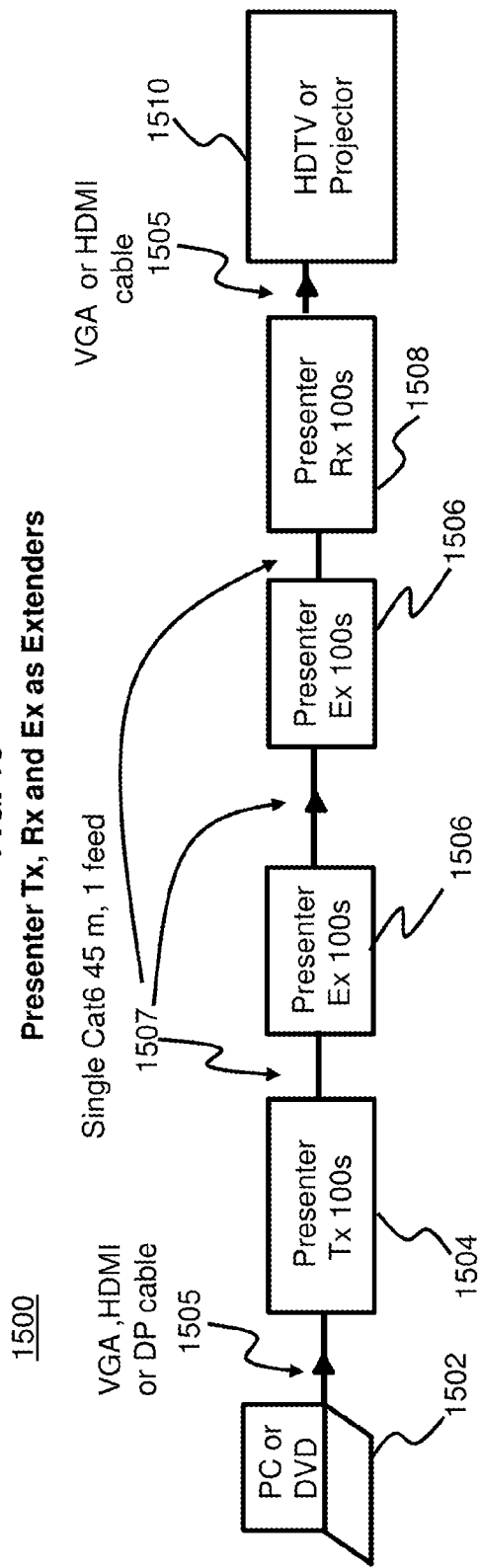

EPR-300CR Circuit Block Diagram

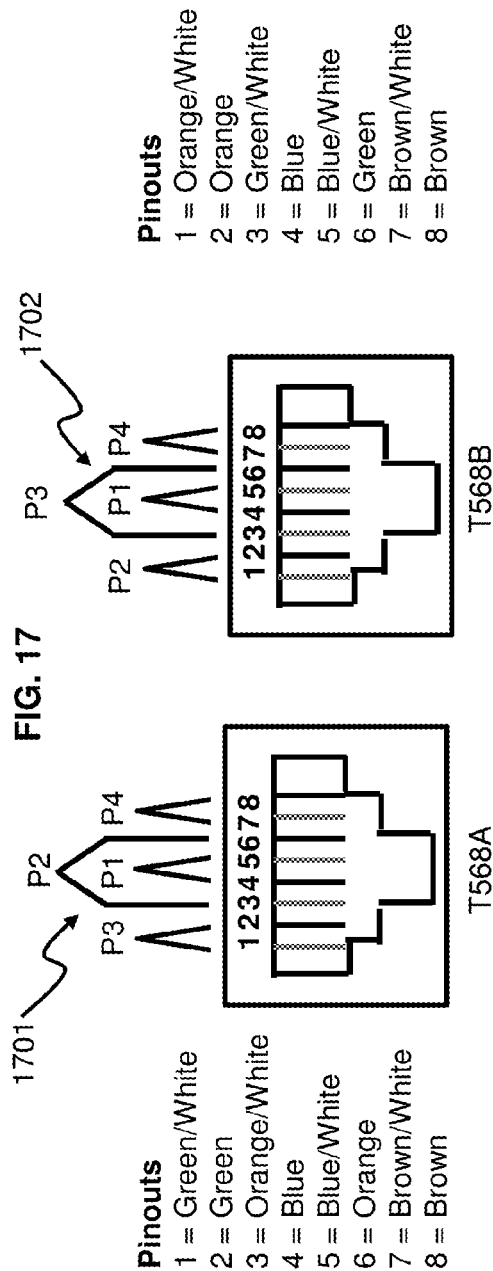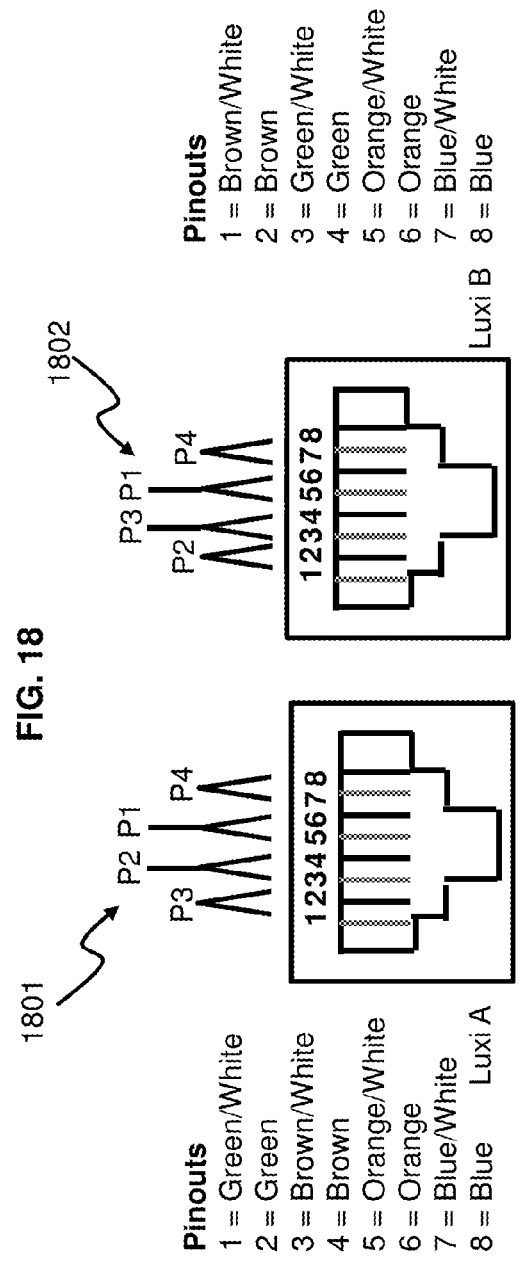

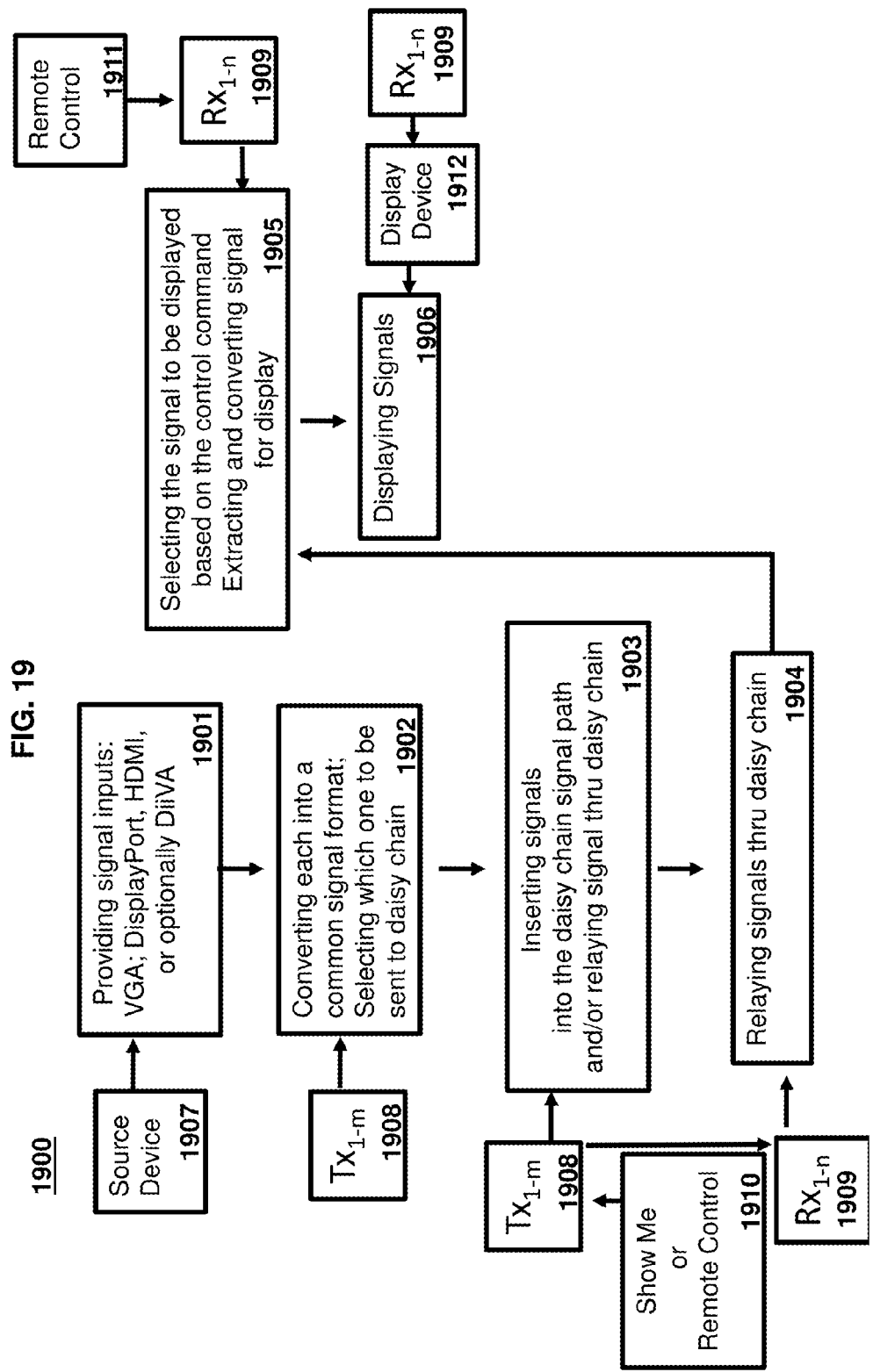

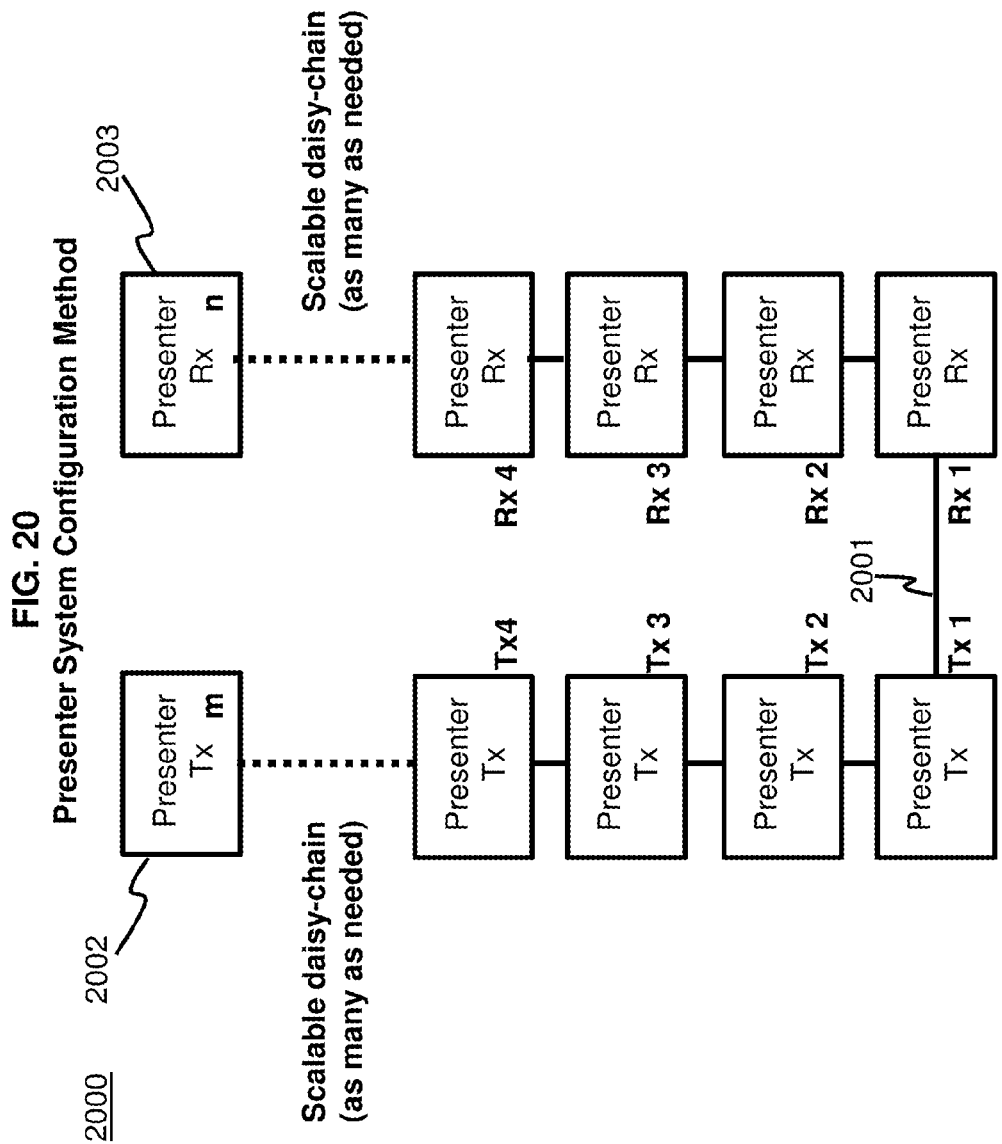

Initial System Device Mapping
2100A

FIG. 21B

Initial System Device Mapping

2100B

Rx
↓
Ping the upstream device; is the response from a Tx device?

- Yes → Mark this device's ID as Rx 1; ping the downstream device. Any Response?
  - Yes → Send this unit's Rx ID to the downstream device
  - No → Send this Max Tx ID = 1 upstream

- No → Request Rx ID number of the upstream device, add 1 as this device's ID; ping downstream device, any response?
  - Yes → Send this unit's Rx ID to the downstream device
  - No → Send Max Rx ID = n downstream; n is this unit's ID number

System signal Routing

FIG. 21C

System routing command is m*ns; the m is the Tx ID number, n is the Rx ID number; s is the lower case letter for switching,. This command is sent to all devices in the daisy chain. The Tx device with the ID number matching the m will insert the audio and video signals from the source into the daisy chain in this link; all other Tx devices will by-pass the signal in the chain. The Rx device with the ID number matching n will extract the signal from the daisy chain and send to the display.

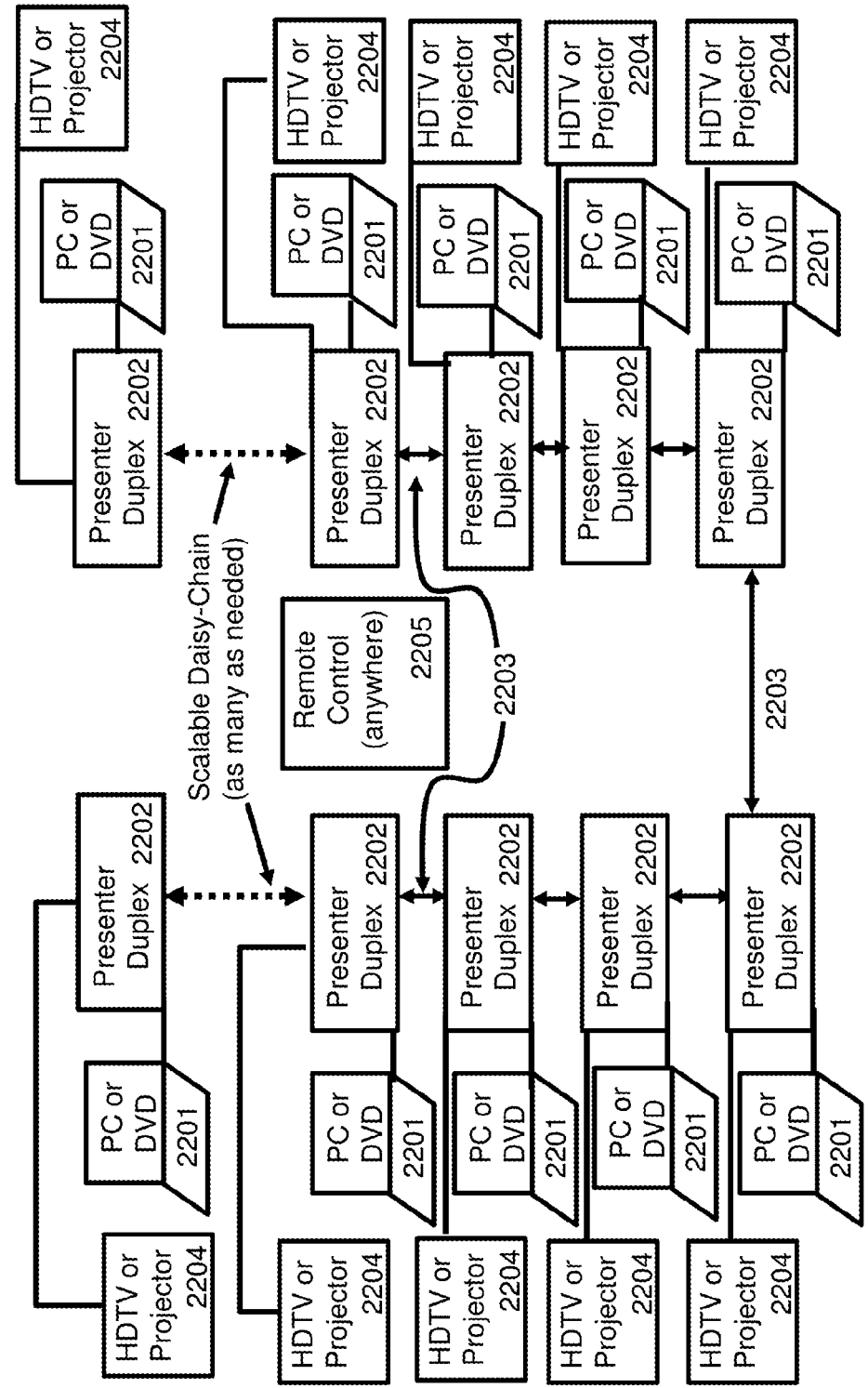

Presenter Duplexer Device Circuit Block Diagram

DAISY CHAIN DEVICES AND SYSTEMS FOR DIGITAL SIGNAL SWITCHING AND DISTRIBUTION

CROSS-REFERENCE TO RELATED APPLICATIONS

This application claims the priority of U.S. Provisional Application No. 61/492,546 filed Jun. 2, 2011, which is incorporated into this application in its entirety by this reference.

FIELD OF THE INVENTION

The invention relates to a system of components, methods, and system control software for performing digital video and audio switching and distribution using multiple transmitters, receivers, nodes, extenders, or bi-directional duplexers via a daisy chain configuration without need for a central switcher or splitter or matrix switcher. Included are transmitters, receivers, nodes, duplexers, control devices, extenders, cables, software and systems.

BRIEF DESCRIPTION OF THE DRAWINGS

FIG. 8 schematically shows an example illustration of a video audio system with multiple Presenter Tx (transmitter) devices and multiple Presenter Rx (Receiver) devices to achieve the same functions as the prior art matrix switcher devices in a cost effective streamlined scalable manner.

FIG. 9B schematically shows an example illustration of a Presenter Tx (transmitter) circuit block diagram, the abbreviation "DC" in the illustration stands for Daisy-Chain.

FIG. 10A schematically shows an example illustration of the front panel (top) and rear panel (bottom) of a Presenter Rx (receiver) device.

FIG. 11 schematically shows an example illustration of a prior art large matrix switcher.

FIG. 12 schematically shows an example illustration of a video audio system with a scalable Presenter system comprising four daisy-chained Tx (transmitter) devices connected to signal source devices (PCs or DVD players), a node (Nd) for switching signals from any of the four daisy-chained Tx (transmitter) devices and sending to any of the four daisy-chained Rx (receiver) devices for display on any of the display devices (HDTVs, Projectors).

FIG. 15 schematically shows an example illustration of a Presenter system with one or multiple extenders (Ex) daisy-chained for long range signal transmission.

FIG. 17 shows an example illustration of a prior art TIA/EIA standard RJ45 Ethernet cabling pinouts.

FIG. 18 shows an example illustration of a new Luxi 8-conductor wire cabling RJ45 pinouts for increased transmission range with less crosstalk between wires.

FIG. 19 schematically shows an example illustration of a method for digital video audio signal switching and distribution with devices (left panel) and steps (right panels) in daisy chain systems.

FIG. 20 schematically shows an example illustration of a system configuration and device mapping method achieved by software.

FIG. 21B schematically shows an example illustration of system configuration software flowchart for mapping Rx (receiver) devices.

FIG. 21C schematically shows an example illustration of system control commands for signal routing.

FIG. 22 schematically shows an example illustration of a Presenter daisy-chained bi-directional audio video and control system with Presenter Duplex devices.

BACKGROUND

Figure 1:
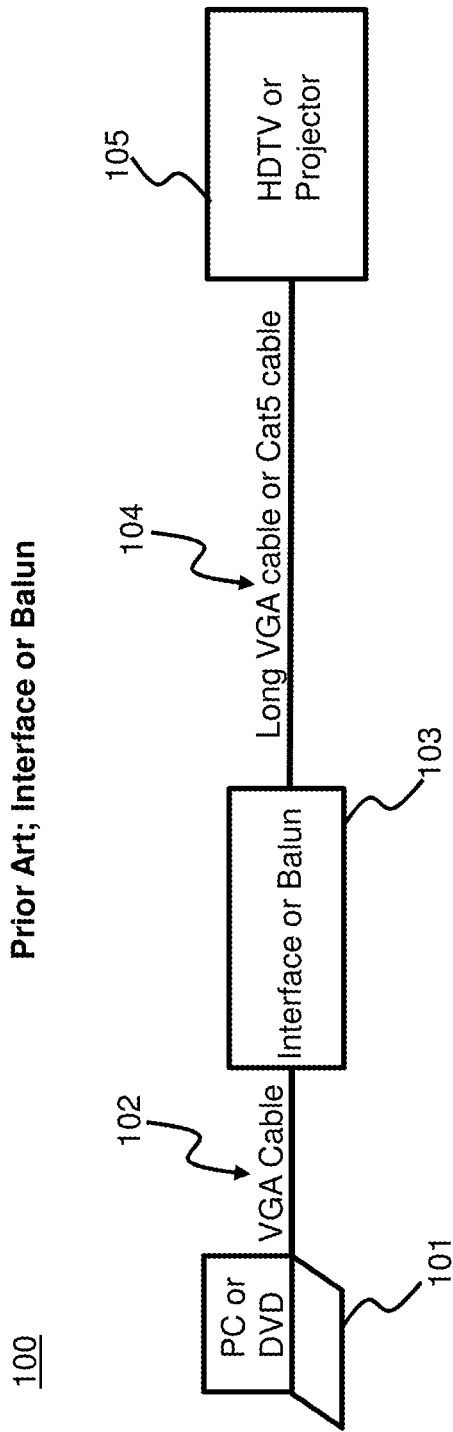
FIG. 1 schematically shows an example illustration of a video audio system with a prior art interface device (or balun).

Most of the corporate, governmental and educational buildings as well as modern homes generally have two electronic systems installed: a computer network and a video audio system. Computer and video audio systems have distinguishable differences: a computer network processes data; multiple devices share the same physical connections by multiplexing data packets in asynchronous communications; while a video and audio system distributes video and audio signals, where each link between a source and a display is a dedicated physical connection for synchronized transmission. Thus though both systems transmit information including video and audio they are fundamentally different in how transmission and control is accomplished.

There are four basic functions of a video and audio system, traditionally performed by four types of products:
  a) Interfaces or baluns: (see FIG. 1) Interfaces (baluns) are devices to connect one source to one display. They also serve to perform long distance signal transmission functions.
  b) Switchers: (see FIG. 3) Switcher devices are to connect multiple sources to one display, and to select which source is to be shown on the display.
  c) Splitters or distribution amplifiers: (see FIG. 5) Splitters or distribution amplifier devices are used to connect one source to multiple displays.
  d) Matrix switchers: (see FIG. 7) Matrix switchers are devices to connect multiple video audio source devices to multiple displays, and to select which sources are to be shown on which displays. If long distance transmission is needed at any input or output, a transmitter and receiver pair needs to be added to that input or output to boost the transmission over the longer distance. If an input or output signal format is different from the matrix signal format, a signal converter (or scaler) needs to be added to that input or output in order to convert the signal format to that of the matrix signal.

The traditional video audio systems using the above referenced products are centralized systems; they have the following limitations and shortcomings:
  a) The centralized design means all the input and output cables need to run to a single location to connect to the switching or distribution device. For example, in a conference room with 20 seats each with a laptop VGA connection, there will be 20 thick VGA cables running from the table across or under the floor to the equipment rack in the adjacent room. This is difficult for installation and also is not visually appealing.
  b) The centralized design also means each input and output cable is long by necessity since all cables must run to the central device. Using long cables presents added problems since for video output where the main type of signal connection format is quickly shifting from the analog VGA and component video to digital HDMI, DisplayPort and DiiVA signal formats. The digital signals have much higher bandwidth, thus cannot be transmitted over long cables often present at centralized video audio systems. Thus more expensive signal transmitters and receivers often have to be used in each cable link to boost transmission over the long cables often needed in centralized video audio systems.
  c) The traditional switching and distribution devices have a fixed number of inputs and outputs. This means if the users want to expand their video system over time to add more inputs or outputs, to add a different signal format, for example HDMI, they have to scrap the old switchers or splitters or matrix switchers, and install bigger new devices, and also re-run more or new cables. Such conversion to bigger systems or for a system capable of receiving a newer signal format like HDMI is a very costly endeavor. Further, as companies and organizations grow needs for video audio systems also grow ensuring that conversions to more expensive systems will be likely.
  d) The fixed number of inputs and outputs on the traditional devices poses an even bigger challenge to the device manufacturers and their resellers. We call one input and one output interface a 1×1 device; a six input and one output switcher a 6×1 device; a one input and 10 output splitter a 1×10 device; and a sixteen input and eight output matrix switcher a 16×8 device. Because there are a wide variety of applications, big or small, in the real world, manufacturers have to make hundreds of different devices encompassing all combinations; 1×1; 1×2; 2×1; 2×2; 4×1; 1×4; 4×2; 2×4; 4×4; . . . ; all the way to 512×512 to meet the customers' needs. In addition, different signal format like VGA, HDMI, DisplayPort, and DiiVA each requires a set of dedicated support products designed for these signal formats. This would multiply the total number of products even further that manufacturers and resellers must stock and sell. For resellers having to stock hundreds of different models to accommodate customers who wish a system quickly presents costly inventory management problems. This is a major financial and logistical challenge for both manufacturers and resellers.
  e) If long distance transmission is needed at any input or output, a transmitter and receiver pair needs to be added to that input or output to boost the transmission.
  f) If an input or output signal format is different from the matrix signal format, an expensive signal converter (or scaler) needs to be added to that input or output.
  g) The centralized design also means that the remote controllers have to be connected to the central device as well. Most switching devices only have one control port. In a conference room or a computerized learning room, where there are many laptops and users, each user prefers to push a button to show his/her computer screen on the big screen. In order to accommodate this common application a complex and costly control system with one controller for each user needs to be installed, with another set of multiple control cables.
  h) Some centralized systems use a modular design to address the expansion (e.g. 4×4 to 8×8 input output capacity) and customization needs, where the products have several slots and the installer can choose the number of input cards and output cards for the particular needs. But this kind of product only offer limited customization; for example, if a product has 8 input slots and 8 output slots, it's only cost effective for the applications with the number of inputs and outputs close to 8 each. Often it would be too expensive to put in an 8×8 system if the customer only uses the system for at most a 6×1 application. More importantly, these solutions still utilize a centralized core design that uses modular expansion slots within the central device. This means that all the limitations and shortcomings associated with a centralized design are still present and require solutions.

Some computer network devices use the daisy chain connection; but they use network protocol and data packet multiplexing, which is not usable for high quality video and audio distribution. Some analog video and audio products use daisy chain connections, but the analog signal quality suffers accumulated degradation over each daisy chained devices. Thus the max number of analog devices can be daisy-chained is very limited.

SUMMARY

A digital video audio signal switching and distribution system, components, methods, and software are provided. The digital video audio systems comprises of one or more component transmitters for signal switching and distribution. Each transmitter (Tx) has one or more interfaces (e.g. back, front, sides, top and bottom) with one or more input connectors for receiving a signal from a cable from a source device and optionally another transmitter or node for scalable systems providing for practically unlimited range for the system. Each transmitter also has one or more output connectors for sending a signal from a cable to a receiver or daisy chain series of receivers, or a node. In some embodiments with more than one transmitter the transmitters are connected in a daisy chain series via cables. In one embodiment one or more nodes are configured to receive signals from transmitters and to switch any of the signals to any receiver or daisy chain of receivers or other nodes. In other embodiments one or more than one node provides an unlimited and scalable system. The system also includes one or more component receivers for relaying signal distribution to a display device (HDTV, projector). Each receiver has one or more interfaces (e.g. front, back, sides, top and bottom) with one or more input connectors for receiving signals from a cable from a transmitter or a node and from other receivers. Each receiver also has one or more outputs for sending a signal from a cable to a display unit and optionally to a receiver or a node. In some embodiments the receivers are connected in a daisy-chain series via cables if there is more than one receiver. In some embodiments, at least one of the receivers is connected to a display device for display but the display device itself is not a core part of this invention. In most embodiments the system also contains at least one cable for providing an input signal from a video audio source device (e.g. computer, tablet/iPad, DVD/Blue-ray player, smart phone/iPhone).

In many embodiments the transmitters contain one or more input selection buttons (e.g. labeled Show Me or another designator) that when selected directs the signal from that transmitter to proceed through all of the downstream transmitters and all of the receivers connected to the system for display on a display device (e.g. monitor, projector). In these embodiments the last activated Show Me selection button controls the signal flow path.

In other embodiments one or more remote control units can be connected to any of the connected daisy-chained series of transmitters and daisy-chained series of receivers or node providing for a second level of control for signal routing to one or more display units (e.g. monitors, projectors). In most embodiments each of the transmitters and receivers has a two-way Ethernet connection with networking switch for accessing the internet. Any of the transmitters and receivers can serve as internet access points for any video audio device connected to a transmitter or receiver of the system. Also all such devices connected to a transmitter or receiver of the system would have internet access via internet signals that are transmitted through the connected daisy-chained series of transmitters and receivers.

In one embodiment the system consists of one transmitter and one receiver. In other embodiments many daisy-chained transmitters are connected to one receiver, while in others one transmitter is connected to many daisy-chained receivers. In a common embodiment many receivers are connected at one point to many receivers where the transmitters and receivers are connected in a daisy-chain.

Each of the transmitters and receiver components contain a circuit board. For transmitters embodiments the circuit board is configured for receiving different types of input signal formats that are converted via scalers and converters to a common signal format (e.g. HDMI). These include a VGA/audio to HDMI scaler, a DisplayPort to HDMI converter, and an optionally a DiiVA to HDMI converter. In some embodiments other new or proprietary signal formats can be converted via scalers and converters for that purpose. Each of the signals is selected by a common signal format (e.g. HDMI) switcher (e.g. 2×1, 3×1, 4×1, or multiple ×1) configured for selecting among input signals for distribution to a digital transmitter. The transmitter circuit board also contains a microcontroller, memory interfaces, Ethernet input with networking switch, and optional selection button (e.g. Show Me Button) configured for selecting and controlling a signal from an activated transmitter. The transmitter circuit board also contains a daisy chain processor configured for inserting the signal into the signal path and a digital transmitter for sending the signal into the signal path which can be through one or more transmitters or receivers connected in series via a daisy chain.

The transmitter can send one or multiple signal feeds over one cable.

In other embodiments the transmitter's circuit board can take power from transmitters and receivers in system and so no separate external power supply is required.

For receiver embodiments each receiver contains a circuit board configured for receiving a common (e.g. HDMI) signal format from a transmitter. Each receiver contains a processor for extracting the signal for relay to a display and a microcontroller for determining and controlling the signal flow path where signal information is extracted for display on a display device. The receiver can receive one or multiple signal feeds from one cable. In other embodiments a receiver can have a power amplification component on the circuit board for audio being sent to speakers.

In most embodiments the system components are connected by cables that can be a coaxial cable, a twisted pair cable, and optical fiber cables or other cables that are developed or adopted to transmit digital video and audio signals. In still other contemplated embodiments optical cable may be used capable of transmitting numerous signals (e.g. >10-100 signals).

In embodiments the audio video system is scalable with additional transmitters being connected in a daisy-chain series and receivers also being added being connected in a daisy-chain series where one transmitter is connected to one receiver. This scalable configuration allows transmission over any distance within a structure or any distance practically required. In optional scalable star configuration embodiments one or more nodes are included that are configured to receive signals from transmitters, or daisy-chains of transmitters or other nodes and to relay any signals to receivers or daisy-chains of receivers or another node where a matrix (e.g. 24×24) can switch any input signal from any input from any connected transmitter or daisy chain of transmitters or another node to any output to any connected receiver, daisy-chain of receivers, or node. Node system embodiments contain a device with a circuit board and are controlled by an internal microcontroller and memory interface for regulating signal flow. Some scalable node embodiments are practically unlimited for size since transmitters, nodes, and receivers can be added to expand the star configuration without limit. In other node embodiments the node contains one or more de-multiplexers each configured to receive a combined multiple signals from one cable or one cable twisted pair and decode it into separated signals for relaying to the matrix and one or more multiplexers each configured to combine multiple separated signals from the matrix into one combined signal and output to each cable or each cable twisted pair to a receiver, daisy-chain of receivers or another node. In still other embodiments the node contains a network switch (e.g. Ethernet switch). Some node embodiments have external power source.

In some embodiments where a certain degree of long or extended distance signal transmission is required an Extender device can be included. Each Extender contains a circuit board with daisy chain extender circuit to equalize and recondition the signal for further transmission. Just like the transmitters and receivers, one or multiple Extender can be daisy-chained with one or multiple transmitters, receivers or nodes for even longer distance transmission.

The connections between transmitters and receivers of the video audio system are made with a cable. In contemplated embodiments optical cable can be used to carry numerous signals. In some embodiments a twisted pair cable and RJ45 connectors are used. In many embodiments eight conductor quad twisted-pair cable is used with a set of eight pins configured to receive individual wires from the four twisted pairs, where none of the two individual wires from each of the four twisted pairs are separated by an intervening individual wire from another twisted pair. In one embodiment the pin/pairs are configured as follows: pin 1 and 2 are for the first and second wire of twisted pair 3; pin 3 and 4 are for the first and second wire of twisted pair 2; pin 5 and 6 are for the first and second wire of twisted pair 1; and pin 7 and 8 are for the first and second wire of twisted pair 4. In another similar embodiment the pin/pairs are configured as follows: pin 1 and 2 are for the first and second wires of twisted pair 2 and wherein pin 3 and 4 are for the first and second wires of twisted pair 3. These straight pin/pair configurations allow improved common mode noise rejection, reduced crosstalk and improved impedance characteristics. Performance improvements are much more significant with the high speed digital video signal transmission in the multiple Gbps data rate.

The video audio system provides a method employing system configuration and control software to perform digital signal switching and distribution for display. In these embodiments a signal is provided from the video audio device in one or more formats, for example, VGA/audio, DisplayPort, HDMI, or optionally DiiVA. The signal goes into one or more transmitter of a daisy-chain connected series of transmitters via a cable. The signal path flows from the input device into and through the transmitter or chain of transmitters or node where the signal is converted into a common signal format (e.g. HDMI) using signal converter or scaler circuits on the circuit board of the transmitter. If more than one inputs are fed to one transmitter, the signal is selected by a switcher, configured on the circuit board of the transmitter or node and is inserted as input into the signal path. Each transmitter has a daisy chain processor configured on the circuit board to insert such signals into the signal path to flow through the transmitter or chain of transmitters or pass through the signals from the connected transmitter or receiver or node in the upstream. The signal is transmitted by linking one of the transmitters to a receiver (or optionally through a node or nodes, or a daisy-chained connected series of receivers). The signal path flows from an individual transmitter or through a chain of transmitters if there is more than one transmitter, to an individual receiver and then through the chain of receivers if there is more than one receiver. In some embodiments a node may be placed between transmitters and receivers or daisy-chains of these devices. Each receiver extracts signals for display on a display device (e.g. monitor, projector). Each receiver has a daisy chain processor configured on a circuit board that pass through all signals to the next connected device while extracts selected signal to output to a display unit. In some embodiments a receiver has a built in scaler to convert the daisy chain signal to a signal format the display is compatible with.

In an optional embodiment control of signal switching and distribution between the chain of transmitters and the chain of receivers is performed by one or more selection button (e.g. labeled Show Me). Activating a selection button on a transmitter allows the signal from the source device connected to this transmitter to be inserted into the daisy chain and ultimately displayed in the display devices connected to the receivers while overwriting the other source signals on the same signal lane (path). Generally, the last activated selection button controls the signal selection for display.

In another optional embodiment a second level of control for signal selection and the routing of signals flowing in the signal path are performed by connecting a remote control unit to any of the connected daisy-chains of transmitters and receivers or node.

In certain embodiments where the span (distance between) from one daisy chain device to the next daisy chain device exceeds the maximum transmission distance, one or multiple extenders can be inserted in between in daisy-chains to extend the distance.

In some of these embodiments the video audio signal may be bi-directional where the transmitters and receivers have circuit boards configured for controlling bi-directional transmission. In these embodiments the system configuration and control software is also designed so that video, audio, Ethernet and control signals can be made to be sent bi-directionally to and from each device in the system (e.g. Tx, Rx, Ex (Extender), Nd (Node)).

In certain bi-directional embodiment systems at least one or more component duplexer for signal switching and distribution has one or more interfaces with a plurality of inputs for receiving a signal from a cable from a source device and/or optionally a duplexer. The duplexer interface also contains a plurality of signal outputs for sending the input signal out for bi-directional transmission to a device and/or to a duplexer. In optional embodiments the duplexer contains one or more signal selection controls including a selection button (e.g. Show Me) configured on the duplexer or connected remote control device. In many embodiment systems a display device is connected to a duplexer of the system (e.g. HDTV, Projector). In duplexer embodiments each duplexer contains a circuit board configured with a signal converter/switcher configured to receive a plurality of signal input formats; a signal converter/distributer configured for outputting the plurality of signals; a digital receiver configured to receive a signal from an upstream duplexer; a daisy chain processor configured to insert signal information into the signal flow path; and a microcontroller configured for determining and controlling the signal flow path, whereby the duplexer daisy chain processor connected extracts signal information from the signal flow path for display on a display device connected to the duplexer. In specific embodiments the duplexer device contains a circuit board configured to receive and output signals selected from the group consisting of VGA, audio, DisplayPort, and DiiVA.

Other objects, features and advantages of the present invention will become apparent from the following detailed description. It should be understood, however, that the detailed description and the specific examples, while indicating preferred embodiments of the invention, are given by way of illustration only, since various changes and modifications within the spirit and scope of the invention will become apparent to those skilled in the art from this detailed description.

DETAILED DESCRIPTION

Presenter Transmitter, Node, Extender, and Receiver Daisy Chain Scalable Video Audio System Provided are scalable electronic devices, systems and methods with system control software to achieve all the digital video and audio distribution functions that traditional interfaces, switchers, splitters, matrix switchers and scalers can do by daisy-chaining multiple transmitters (Tx) and receivers (Rx) and optionally node to form scalable and easy to install systems. To distinguish these new Tx and Rx devices from the traditional Tx and Rx devices, embodiments of these devices are referred to as "Presenter Tx" and "Presenter Rx" throughout this disclosure.

Figure 2:
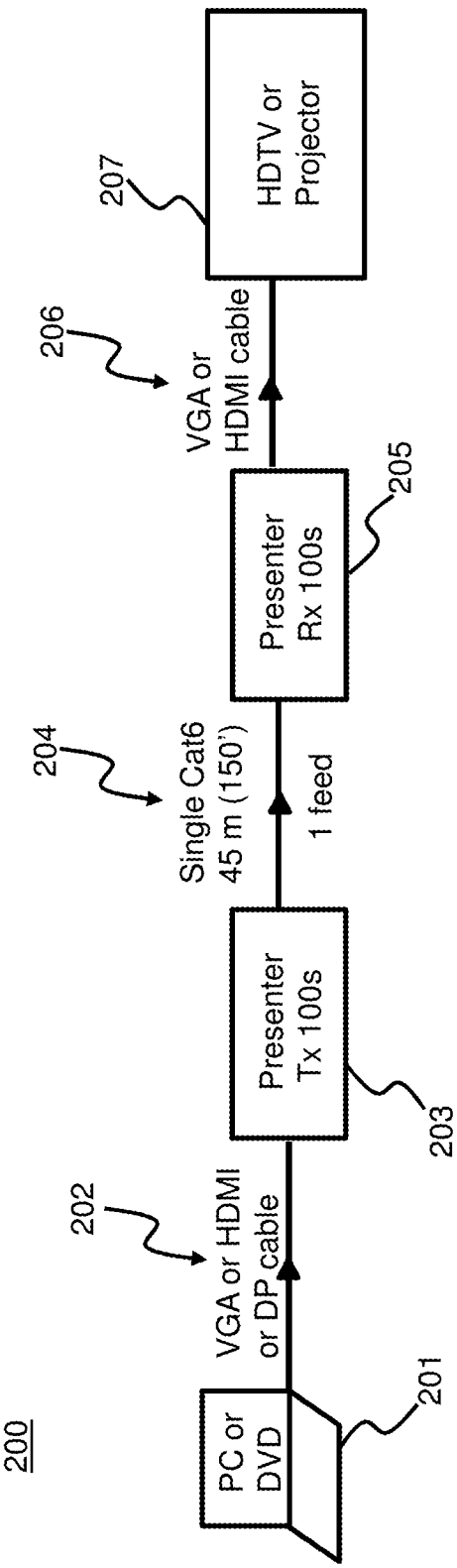
FIG. 2 schematically shows an example illustration of a video audio system with Presenter (the family name of the invention products used throughout this document) Tx (transmitter device) and Presenter Rx (receiver device) to achieve the same functions as the prior art interface devices.

Referring now to FIG. 1 and FIG. 2; schematically shown is a prior art video audio system 100 and Presenter video audio system 200. The Presenter video audio system 200 is shown with a single source device 201 (e.g. laptop, tablet, or DVD/Blu-ray player, or other device) connected to a single display device 207 (e.g. projector or HDTV, or other device) via a single Presenter Tx 203 and Presenter Rx 205 component with cables 202, 204, 206. Different embodiments employ cables 204 consisting of coaxial cable, Twisted Pair (e.g. Cat6) cable or optical fiber cable to mediate connections between the components. This system replaces traditional 1×1 signal interface systems 100 shown in FIG. 1. Such prior art systems connect a source device 101 to a central interface 103 (or a balun) via a VGA cable 102, and a VGA (or a Cat5) cable 104 to a display device 105.

Figure 3:
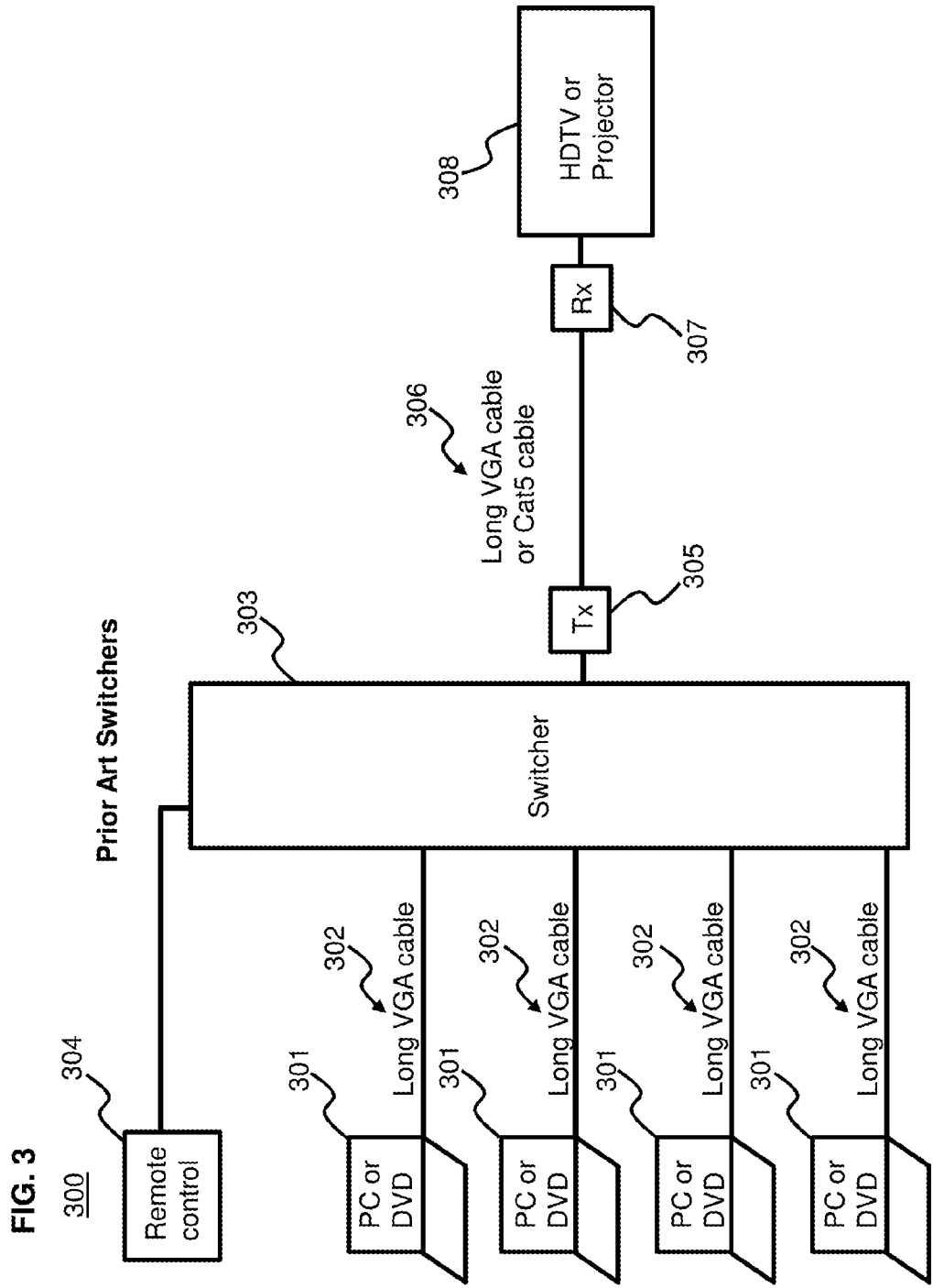
FIG. 3 schematically shows an example illustration of a video audio system with a prior art switcher device.
Figure 4:
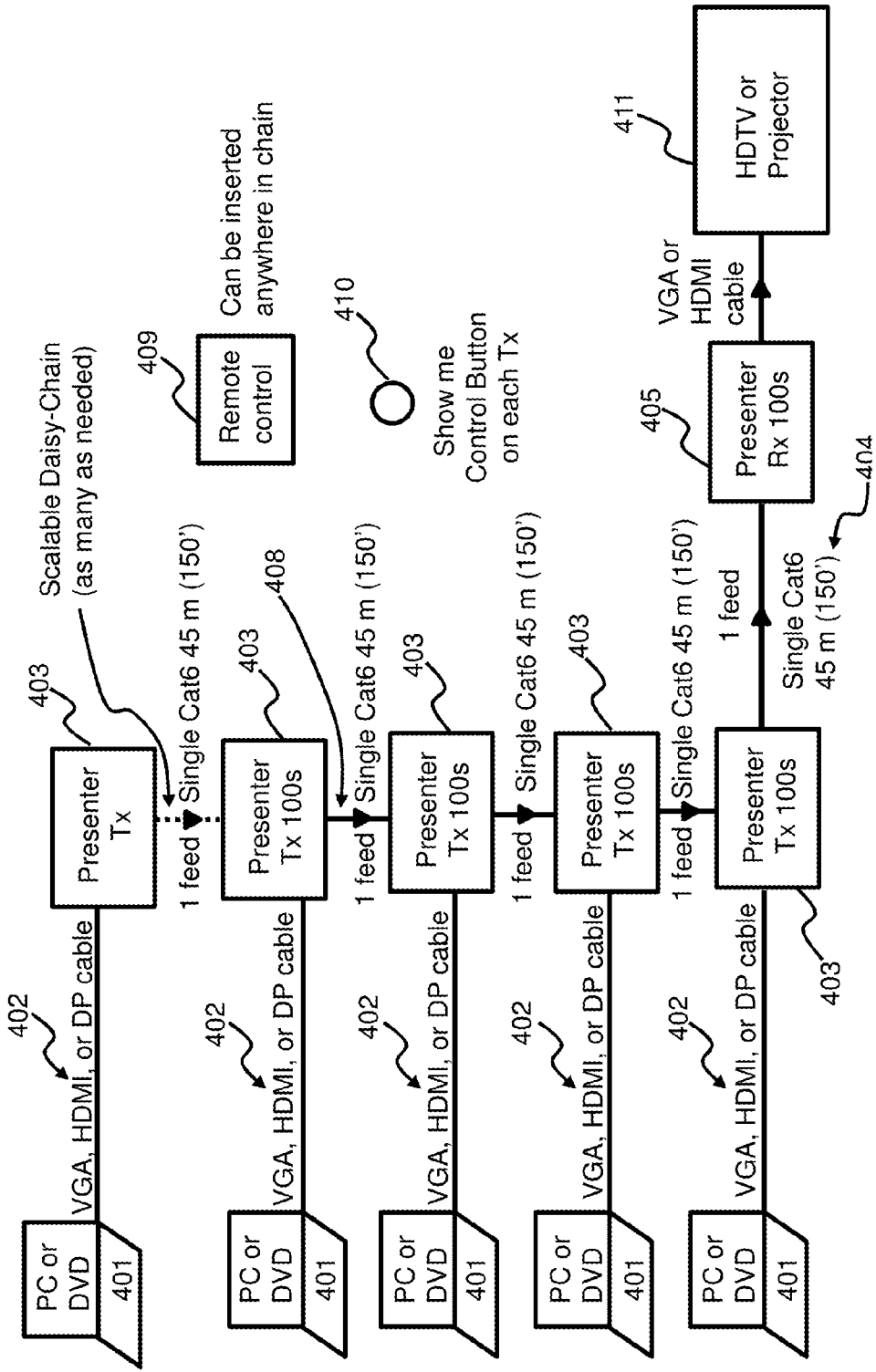
FIG. 4 schematically shows an example illustration of a video audio system with multiple Presenter Tx (transmitter) devices connected in a daisy chain and one Presenter Rx device to achieve the same functions as the prior art switcher devices in a cost effective streamlined scalable manner.

Referring now to FIG. 4; schematically shown is an embodiment video audio system with a plurality of signal devices (e.g. PC/DVD) and a plurality of Presenter Tx components connected to a single Presenter Rx component. This embodiment system replaces traditional signal switcher systems such as those shown in FIG. 3 (below). In this embodiment the system 400 can have multiple source devices 401, where each is connected via a cable 402 to a Presenter Tx 403 component. These Presenter Tx's devices 403 are connected in series by a daisy chained cable 408. Each cable can be coaxial, Twisted Pair (e.g. Cat6) cable or optical fiber cable in different embodiments. Each presenter Tx 403 component is then connected to a Presenter Rx 405 component via a cable 404 in some embodiments. Then a Presenter Rx 405 is in turn connected to a display device 411. The signal path flows from each PC/DVD signal device to each connected Presenter Tx and downstream from Presenter Tx m to Presenter Tx 1 and then from the Presenter Tx 1 to the Presenter Rx and finally to the display device 411 for display. Control of the signal flow to the display 411 can be via a selection button 410 or switch (e.g. Show Me) or via insertion of a remote control 409 to one of the Tx 403 or Rx 405 of the system 400.

In the embodiments where each Presenter Tx component 403 (1-m) has a push activated selection button 410 labeled, for example as "Show Me" or with another identifier label when a user pushes his/her "Show Me" button 410, the signal from his/her source device 401 will be passed through all of the downstream daisy chain of Tx devices 403 (1-m) along the signal path and through the Presenter Rx device 405 and then will be shown on the display 411. This simple control can replace the central control of the display path is and available for all users in the system. In other embodiments an optional remote control 409 can be connected into any of the Presenter Tx 403 or the Presenter Rx 405 component to offers a second level of control for the signal. In these embodiments the remote can control and direct which signal is displayed over the Show Me selection button system. In still other embodiments other switches or activators may be used in place of buttons or remote controls.

Referring now to FIG. 3, schematically shown is a prior art video audio system for comparison to embodiments disclosed in FIG. 4. In this prior art system 300 all input signals from PC/DVD devices 301 are connected by VGA cable 302 to a central switcher 303. The central switcher 303 must be configured to receive the required number of input signals (e.g. four are shown) and chooses among these signals for eventual display. In many cases a standard transmitter Tx 305 and receiver Rx pair 307 are required to boost the signal from the switcher 303 over longer cables 306 for long or extended transmission distances encountered in typical installations to a display device 308. In some of these systems remote controls 304 can be connected to the central switcher only.

Figure 5:
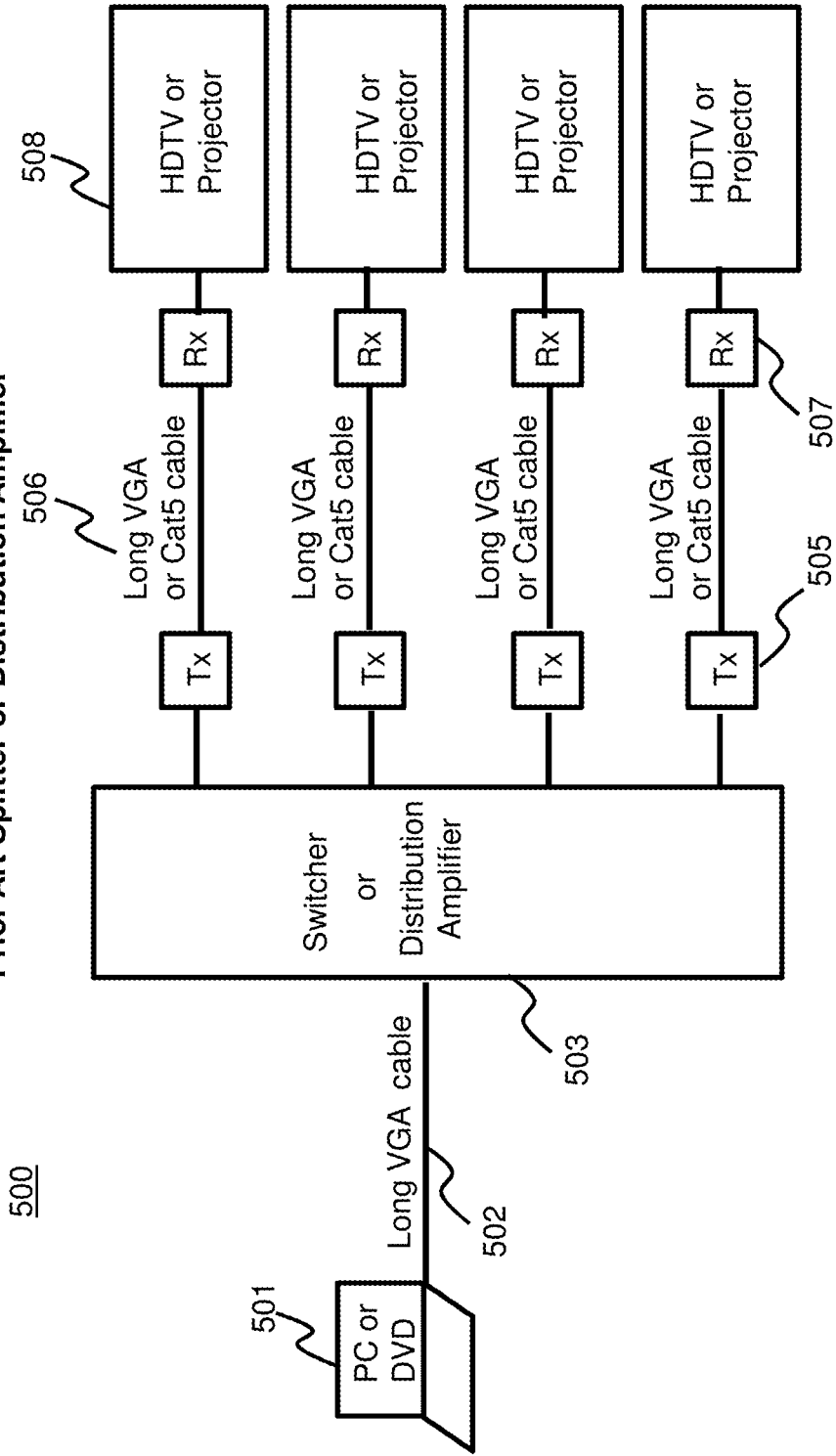
FIG. 5 schematically shows an example illustration of a video audio system with a prior art splitter device (distribution amplifier).
Figure 6:
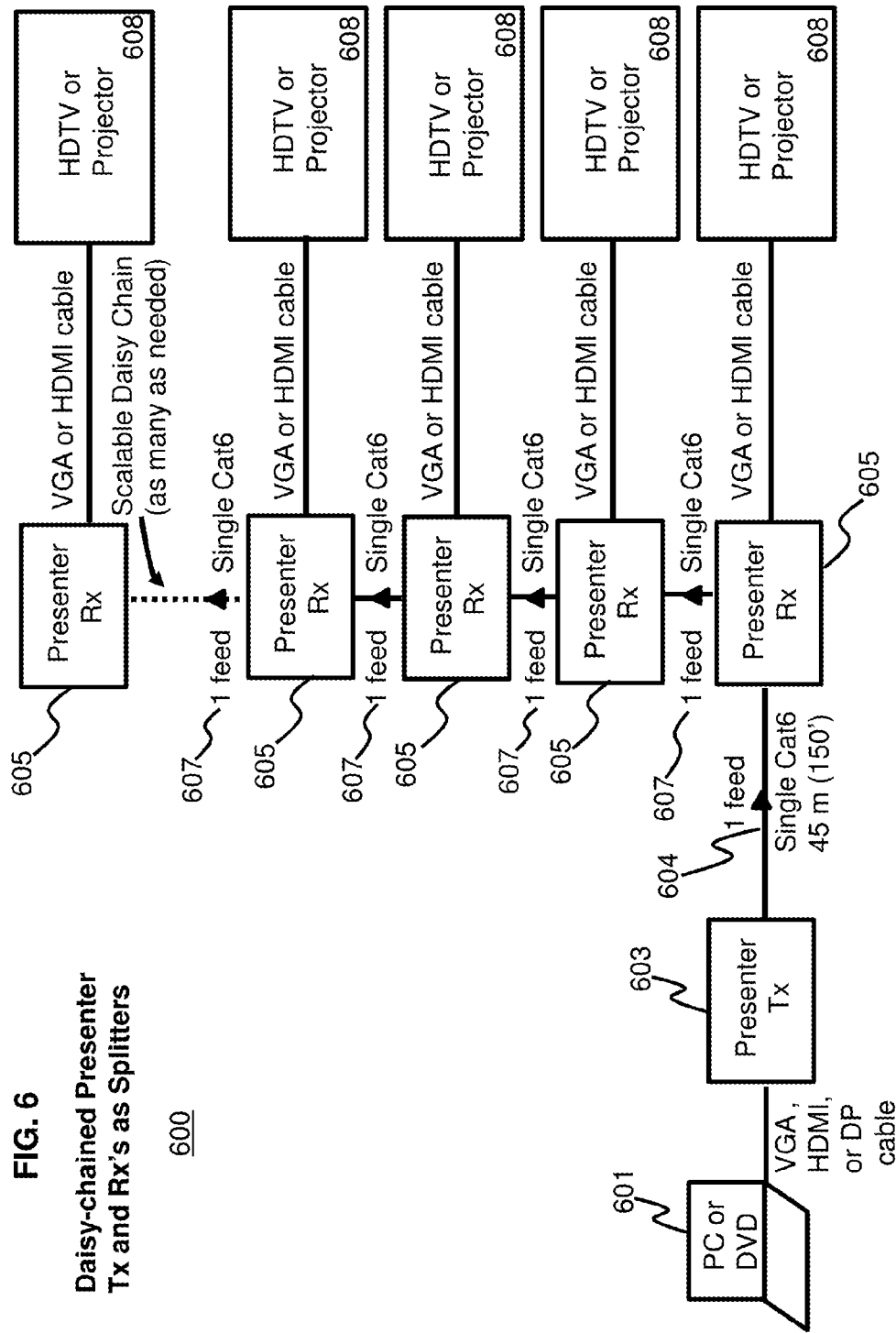
FIG. 6 schematically shows an example illustration of a video audio system with one Presenter Tx (transmitter) device and multiple Presenter Rx (receiver) devices connected in a daisy-chain to achieve the same functions as the prior art splitter devices in a cost effective streamlined scalable manner.

Referring now to FIG. 6, schematically shown is an embodiment video audio system 600 where a single source device 601 is connected to a Presenter Tx device 603 and daisy chain of Presenter Rx devices 605 each connected to a display device 608. This system 600 replaces traditional signal splitter systems shown below in FIG. 5 for comparison purposes. In this embodiment the Presenter Tx device 603 is connected to plurality or multiple daisy-chained Presenter Rx devices 605 via a cable 604 and 607 (e.g. coaxial, Twisted Pair or optical fiber cable) in between each Presenter Rx 605 component. Each Rx device 605 is then also connected by cable to a display device 608. The signal flow is transmitted throughout the daisy chain of Presenter Rx components 605 from bottom to top (1-n) along the signal path, and then is outputted to all display devices 608. In embodiments the number of Presenter Rx components is scalable and added components can be connected to the daisy chain as needed. This allows flexible addition of units as needed without need to reconfigure the system.

Referring now to FIG. 5, schematically shown is a prior art video audio system 500 used for splitting a single signal into multiple signals for display on multiple display devices 508. In this prior art system 500 a central splitter 503 is set with a specified number of output capacity (shown is a 1×4 splitter). This splitter in addition to being fixed for number of the outputs typically can receive only one signal type and must have multiple cables 506 as outputs from the central location to display devices. When the distance from the central splitter to display units is long, often required in many installations, additional standard Tx 505 Rx 507 pairs are mandatory to boost transmission over such longer distances to the display units.

Referring now to FIG. 8, schematically shown is an embodiment video audio system configured to receive a plurality of input signals from source devices and a plurality of Presenter Tx and Presenter Rx components to rout signals for display. This system replaces traditional signal matrix switcher systems shown below in FIG. 7 for comparison purposes. In this embodiment system 800, there are multiple source devices 801, each connected to a Presenter Tx 803 device and each connected to each other in the daisy chain configuration. Each of the Presenter Tx 803 components are in turn connected to a Presenter Rx components 805, each of which are connected to multiple display devices 808. In this embodiment all of the Presenter Tx 803 (1-m) and Rx 805 (1-n) devices are daisy-chained in series with cables 807 (e.g. coaxial, Twisted Pair, optical fiber cable). The signal path flows from each source device to the cognate Presenter Tx and then downstream through the Presenter Tx daisy chain to the connected Presenter Rx and then up through the Presenter Rx daisy chain with outputs to each cognate display unit. Multiple remote control devices 806 can be connected to any point of the system to define the signal routing as a second level of control, which ultimately determines which source goes to which display. Also the Presenter Tx components of this embodiment can optionally have the signal selection Show Me button for putting a first level of signal selection control on the signal flow path (not shown). Finally, additional Presenter Tx 803 or Presenter Rx 805 devices can be added to this scalable system 807.

Figure 7:
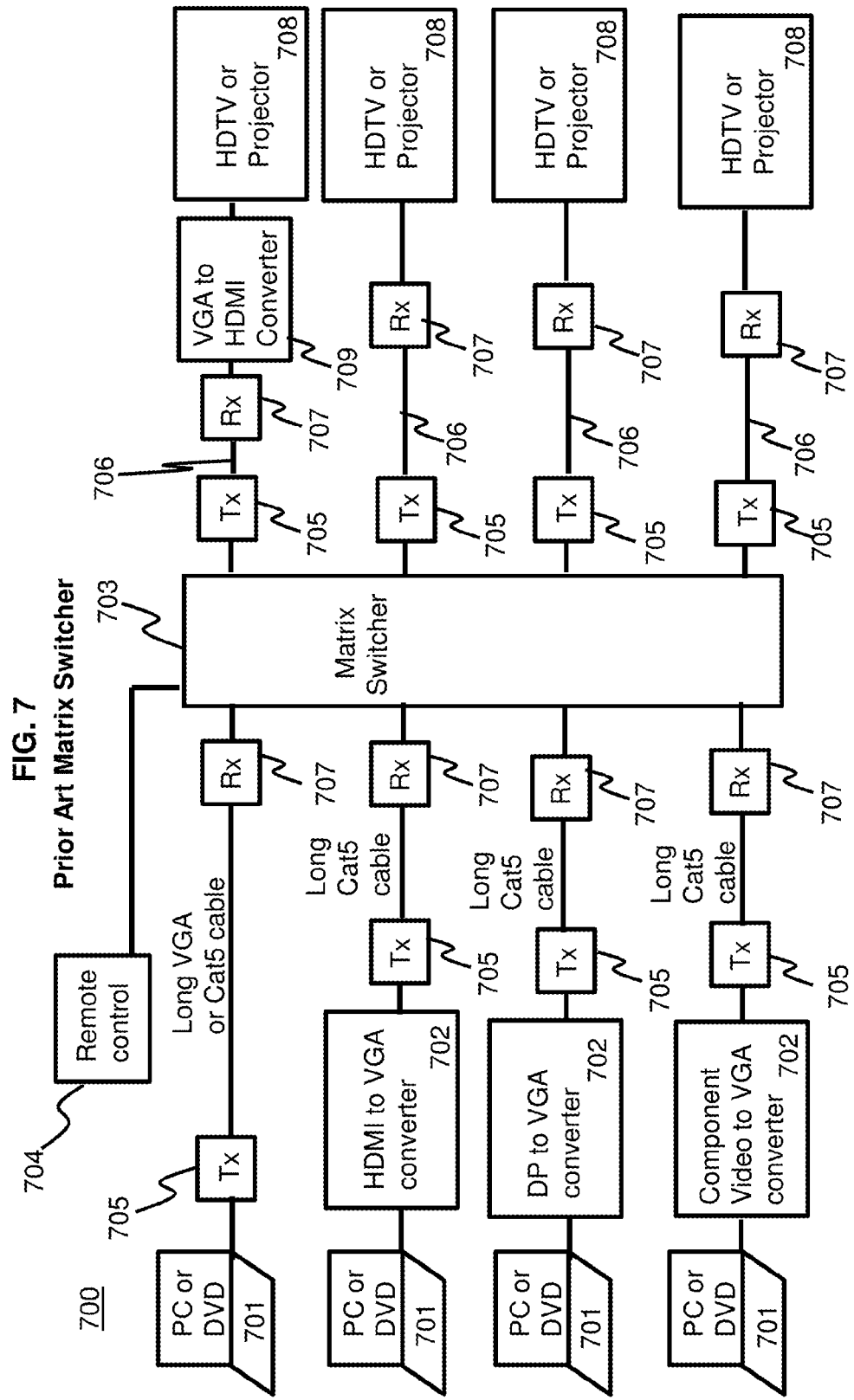
FIG. 7 schematically shows an example illustration of a video audio system with a prior art matrix switcher device.

Referring now to FIG. 7, schematically shown is a prior art video audio system with a matrix switcher. In this prior art system 700 the central matrix switcher 703 receives the input signals from source devices 701 and selects which signals are selected to proceed to a display unit 708. As with such prior art devices the central location requires input and output cables come from this central location. Also if a significant distance exists between source devices 701 and the matrix switcher 703 or between the display devices 708 and the same matrix switcher additional paired standard Tx 705 and Rx 707 devices are required to mediate transmission over such longer distance cable 706. Also additional signal format converters (scalers) 702 must often be added to change signal format when the input signals are different from the matrix signal format. Similarly additional signal format converters (scalers) 709 must often be added to change signal format when the signals the displays are capable of showing are different from the matrix signal format. Remote controls 704 also must connect to the central matrix switcher 703.

In most all of the embodiment Presenter systems referred to above with equivalent functions for mediating traditional interfaces, switchers, splitters, matrix switchers and scalers of variety input and output sizes can all be replaced by the Presenter Tx and Presenter Rx, and optionally Presenter node (Nd) and Presenter extender components (Ex). For example, a 7×4 signal distribution system would consist of 7 Presenter Tx and 4 Presenter Rx devices connected in a daisy-chained series together. This system flexibility will dramatically reduce the number of product models manufacturer need to make, re-sellers need to carry and installers need to use. Further this video audio system is infinitely scalable simply by adding sequential individual Presenter Tx and Presenter Rx components or Presenter Nd components to a daisy chain or connection multiple chains with Presenter node. Installers can add as many Presenter Tx and source devices; as many as Presenter Rx, Presenter Nd and display devices as needed to a new system or an existing system. In some cases the Presenter Ex can be used for long intervals between Presenter components. This Presenter system offers the ability to span any distance within a structure or most any practical distance required by daisy-chaining multiple Presenter Tx, Presenter Rx, Presenter Nd, or Presenter Ex devices.

All the Presenter systems have the flexibility to take in multiple signals including but not limited to VGA, HDMI, DisplayPort, and DiiVA signal format for maximum source compatibility. The Presenter system offers output multiple signal formats including but are not limited to HDMI or VGA signal format for maximum display compatibility. In contemplated embodiments, if a new signal format is created in the future, the system can be engineered to replace or augment one Presenter Tx or Rx device rendering this device compatible with the new signal format.

Since there is only one cable at any point of the system, the installation is very easy and clean. Further, cable length can be kept short in many installations due to the flexibility of the daisy chain configuration for Presenter Tx and Presenter Rx components. Installers can find the next closest device and link them with a single cable without having to lay long cables in most cases. All daisy chain connections are made by a single cable (e.g. coaxial, Twisted Pair (e.g. Cat6) or optical fiber cable), making the wire pulling and termination easy to accomplish. The daisy chain configuration also allows virtually an infinite range of signal transmission as long as there's a Tx or Rx or Ex device within the max single run distance.

In order to better understand the Presenter video audio embodiments individual components of the system are discussed below.

Presenter Transmitter (Tx)

Figure 9A:
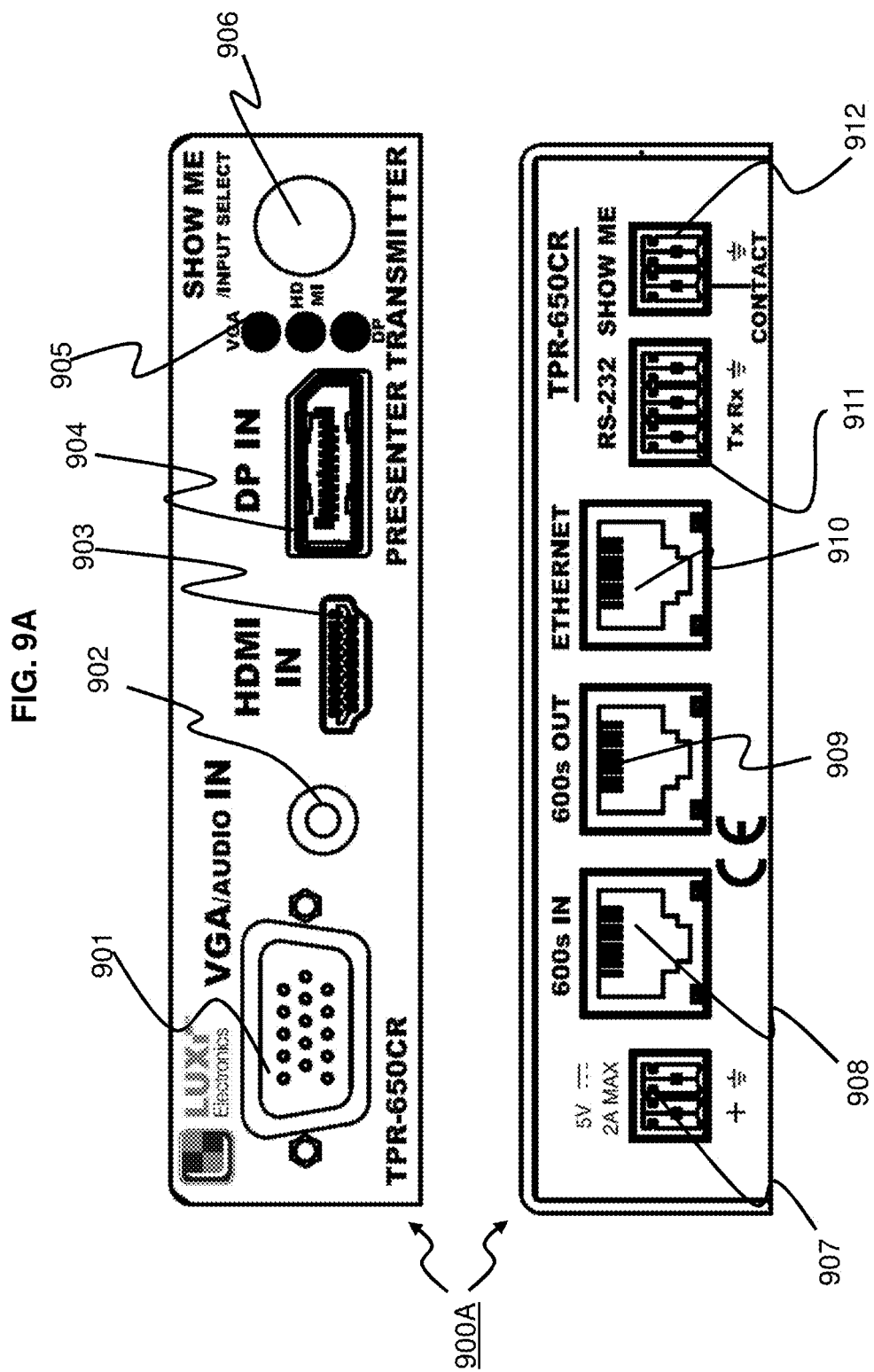
FIG. 9A schematically shows an example illustration of the front panel (top) and rear panel (bottom) of a Presenter Tx device.

Referring now to FIG. 9A and FIG. 9B, schematically shown are embodiment interfaces for a Presenter Tx component and the circuit board block diagram for the same. In FIG. 9A representative interfaces 900A are shown with a first interface (e.g. front, top panel) that contains multiple signal inputs (left to right) that come from cables from various source devices such as computers, tablets/iPads, DVD/Blu-ray players, and smart phones/iPhones. These input connectors include but are not limited to: a female VGA input connector 901 (computer/smart phone), a female mini jack input connector 902 for analog audio signal (smart phone/iPhone), and a female HDMI input connector 903 (computer/Blu-ray player), and a female DisplayPort input connector 904 (computer). In other embodiments a female DiiVA connector can be included or other connectors for newly developed or proprietary adopted signal formats (not shown).

The first interface is also shown with a set of three light emitting diodes (LEDs) 905 which indicate which signal format is selected. In other embodiments 1, 2, 3, 4, 5, 6, or more LED indicators can be included for showing the signal selected. The tactile selection or push button 906 (also called the Show Me button) that selects select which of the 3 input signals to be sent (inserted) to the daisy-chain and ultimately to the display. The selection button also serves as Show Me control button which enables this transmitter to feed (insert) the signals to the daisy chain of Presenter transmitters while all other transmitters and receivers serve in by-pass mode if the main second level remote controller allows or does not override this control.

In FIG. 9A, a second representative embodiment interface 900A is shown (e.g. back, bottom panel). In this embodiment (left to right) a female captive screw power input connector 907 provides a plug from which an optional external power supply can be connected. Next is a female RJ45 input connector 908 from which the digital signal from another upstream transmitter in the daisy-chain series of connectors comes in where it is converted into the digital signal format of the transmitter daisy chain. Another output connector 909 is next from which either the digital signal from the upstream transmitter of the daisy-chain (by-pass) or one selected input signal of the 3 input signals (insertion) comes out to the next device downstream. In one embodiment the signal feed is 1 single feed per cable (100s). In other embodiments the signal feed is 3 signal feeds per cable (300s). In other embodiments the signal feed is 6 feeds per cable (600s). In still other embodiments the signal feed can be any multiple feeds per cable (e.g., 2, 4, 5, 10, 20, 30, 40, 50, 60, 70, 80, 90 and 100 or more). This is followed by another female RJ45 connector 910 from which a two way Ethernet signals or other network signals come in and out and are transmitted through the transmitter and receiver daisy-chains or optionally via a node or nodes of the system. A female captive screw connector 911 follows from which the serial control signals in RS-232 format (or other format e.g. RS-485) comes in and out and is transmitted through the daisy-chain to and from other transmitters and receivers in the daisy chain to control the signal flow in the system and other device functions. Finally, a female captive screw connector 912 is shown from which an optional external contact closure type control device with a tactile push button switch is connected to form the same function as the 906 button on another (front) panel of the device. Other embodiments may employ switches, toggles, or other activators for similar functions. In still other embodiments the transmitter may have at least one interface with least one or a plurality of inputs and at least one or a plurality outputs which may serve similar but yet distinct functions related to signal selection and control based on signal input or output requirements from customized installations.

Referring now to FIG. 9B, schematically shown is an embodiment circuit board for a representative Presenter Tx. A representative Tx circuit board 900B is shown where the signal inputs are shown for VGA in 901, Audio in 902, and HDMI in 903 and DisplayPort in 904, as well as a serial binary single-ended data and control signals RS-232 control in 911, and external and optional Show Me input 912. The VGA and audio signals are converted into HDMI format by a VGA/audio scaler 922. The DisplayPort signal is converted to HDMI format by a DisplayPort to HDMI converter 923. In other embodiments added signals such as DiiVA or other new or proprietary formats can be added to the IC (not shown). These signals are selected by switcher, e.g. shown is a 3×1 HDMI switcher 921. In other embodiments other switchers can be employed for accommodating more or less signals (e.g. 1×1; 1×2; 2×1; 2×2; 4×1; 1×4; 4×2; 2×4; 4×4; . . . ; all the way to 256×256, or other combinations). The HDMI in signal 903 also connects to the HDMI switcher 921. The HDMI switcher then is connected to a digital transmitter and daisy-chain matrix processor 920 for signal transmission. In some embodiments the transmitter only has one HDMI input and no built in scaler or switcher. The control signal 911 and External Show Me control in 912 and selection button 906 are connected to the microcontroller 924 and memory interface 925 and then to the HDMI switcher 921 and separately to the daisy-chain processor 920. An encoder 926 converts industry standard or proprietary format signals into a format for transmission via the daisy chain processor 920 through the daisy chain of Presenter Tx and Rx and other components. In many embodiments this daisy chain signal format is optimized for long distance transmission and for multiple signal flow.

The transmitter circuit board is also connected to the series of daisy-chain of transmitters by connectors in 908 and out 909 via cables. In some embodiments a node may be placed to connect to transmitters or daisy-chains of transmitters and to receivers and daisy-chains of receivers (see FIG. 12). Power 907 and the network, e.g. Ethernet 910 also are connected to the digital transmitter and daisy chain processor 920. A software program provides for the command query for initial mapping of the transmitter and for signal routing (see FIG. 20A; FIG. 20C). In operation, generally one of the signal formats (i.e. VGA/audio; DisplayPort, HDMI or DiiVA) is selected as the common signal format for the daisy-chain; any other input signal formats are converted to this common signal format. The software and microcontroller 924 and memory interface 925 select and control the signal flow, and switching through the transmitter and daisy-chain of transmitters. Depending on the signal type the scaler or converters change the signal into HDMI where the HDMI switcher passes the signal to the digital and daisy chain processor 920 where signal information is formatted for transmission and is inserted by the processor into the signal path for transmission out of the transmitter and ultimately to a receiver or receivers. The specific LED indicates the particular input is selected to be sent through the transmitter on the interface.

Presenter Receiver (Rx)

Figure 10B:
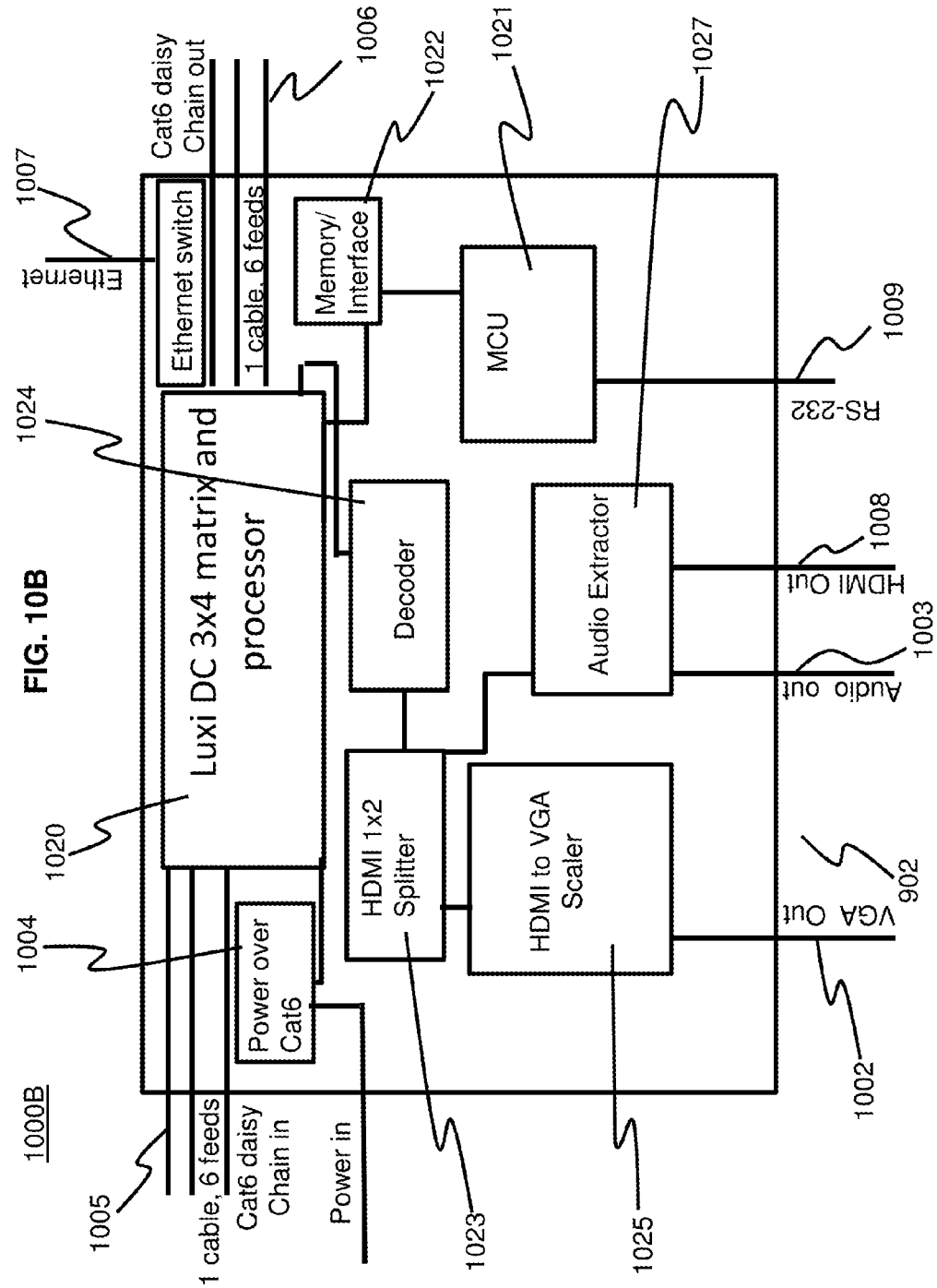
FIG. 10B schematically shows an example illustration a Presenter Rx (receiver) circuit block diagram, the abbreviation "DC" in the illustration stands for Daisy-Chain.

Referring now to FIG. 10A and FIG. 10B, schematically shown are embodiment interfaces for a representative Presenter Rx and circuit board for the same. In FIG. 10A two embodiment interfaces 1000A are shown (e.g. top panel: front; bottom panel: rear). In the top panel (front) a power indicator 1001 is illuminated if the component gets sufficient power either from an external power supply input 1004 or from the power riding on the daisy-chain and coming in from either upstream input 1005 or downstream output 1006. A female VGA output 1002 and audio output 1003 are located also on this interface (front). In other embodiments the Presenter Rx has at least one interface or alternately a plurality of interfaces to mediate connection based on signal input or output requirements from customized installations.

In the bottom panel shown is a representative interface 1000A (rear) with input and output connectors (left to right) including a female captive screw power input connector 1004 from which the optional external power supply is plugged into the Presenter Rx component. Next is a female RJ45 input 1005 from which the digital signal from upstream transmitters or receivers in the daisy-chain is input into, and a female RJ45 connector 1006 outputs signal (by-passing) to the next receiver downstream. Next is a female RJ45 connector 1007 from which the two-way Ethernet signals come in and out and is transmitted through the daisy chain to and from other connected series of daisy chain receivers and transmitters if there are more than one of each. Next is a female HDMI output connector 1008 from which the digital signal from the upstream transmitters or receivers of the daisy-chain is output in the decoded HDMI format to a display device like a projector or a HDTV. In one embodiment the signal feed is 1 single feed per cable (100s). In other embodiments the signal feed is 3 signal feeds per cable (300s). In other embodiments the signal feed is 6 feeds per cable (600s). In still other embodiments the signal feed can be any multiple feeds per cable (e.g., 2, 4, 5, 10, 20, 30, 40, 50, 60, 70, 80, 90 and 100 or more). Next is a female captive screw receiver connector 1009 from which the serial control signals in RS-232 or other signal (e.g. RS-485) format comes in and out and is transmitted through the daisy-chain to and from other transmitters and receivers and nodes in the daisy-chain to control the signal flow in the system and other device functions.

Referring now to FIG. 10B, schematically shown is an embodiment circuit board for a representative Presenter Rx component. The circuit board 1000B receives six digital signal inputs into the digital receiver via connector 1005 and to daisy chain processor 1020. The six digital signals are sent out via the connector 1006 to other receivers in the daisy chain series (by-passing) to the next receiver (or node) downstream. The digital signal from upstream transmitters or receivers is extracted from the daisy-chain and decoded from the daisy chain format into HDMI format (or other industry standard or proprietary format) by decoder 1024 and fed to HDMI splitter 1023 (e.g. 1×2) then to HDMI to VGA scaler 1025, which converts HDMI to VGA and output to display via connector 1002. An audio extractor 1027 is also connected to the HDMI splitter 1023 to extract audio from the HDMI and output to connector 1003. The HDMI signal is output to connector 1008. In some embodiment the receiver only has one HDMI output and has no built in splitter or audio extractor. The microcontroller 1021 and memory interface 1022 receives the serial control signals in from connector 1009 and transmits it through the daisy-chain for system control. Serial control signals in RS-232 1007 or other signal (e.g. RS-485) format comes in and out and power can be provided from an external source 1004. A network switch provides an Ethernet connection 1007 to the internet.

Presenter Node (Nd)

Referring now to FIG. 11 and FIG. 12, schematically shown in FIG. 11 is a prior art large matrix switcher system and shown in FIG. 12 is a scalable Presenter video audio node containing system. Referring first to FIG. 12, shown is a system 1200 with four daisy-chains of Presenter transmitters (Tx) 1203 with each Presenter Tx individually connected to a signal source device (e.g. PC, DVD player). A remote control 1202 is shown connected that can be inserted anywhere in the system's chain. In embodiments a node or nodes 1201 are connected to transmitters or daisy-chains of transmitters. In one embodiment four transmitter daisy-chains connect via separate inputs on an interface of the Presenter node (Nd). Four receiver daisy-chains 1204 are connected to the node output and to display devices (e.g. HDTV or Projectors). Both Presenter transmitters and Presenter receivers are connected via cable which may be any type including but not limited to Cat5, Ca6, cable as well as other forms such as coaxial, and optical fiber.

In other embodiment the inputs on a node may be more from 5, 6, 7, 8, 9, 10 or more as required by the application. In other embodiments multiple nodes can be added to the system without limit for the number and may be used for points to branch the system in a star-configuration from either transmitters or receivers of their daisy-chains of Presenter transmitters and Presenter receivers.

In contrast the FIG. 11 prior art Large matrix switcher system 1100 each signal source 1103 in connected directly to a standard transmitter (Tx), a standard receiver (Rx) 1104 and a scaler to a traditional matrix switcher 1102 (e.g. 24×24) that can be remote controlled 1101 and also directly connected to similar set ups on the output end. Each of these connections requires a dedicated cable making the installation cumbersome requiring numerous cables and components.

Figure 13A:
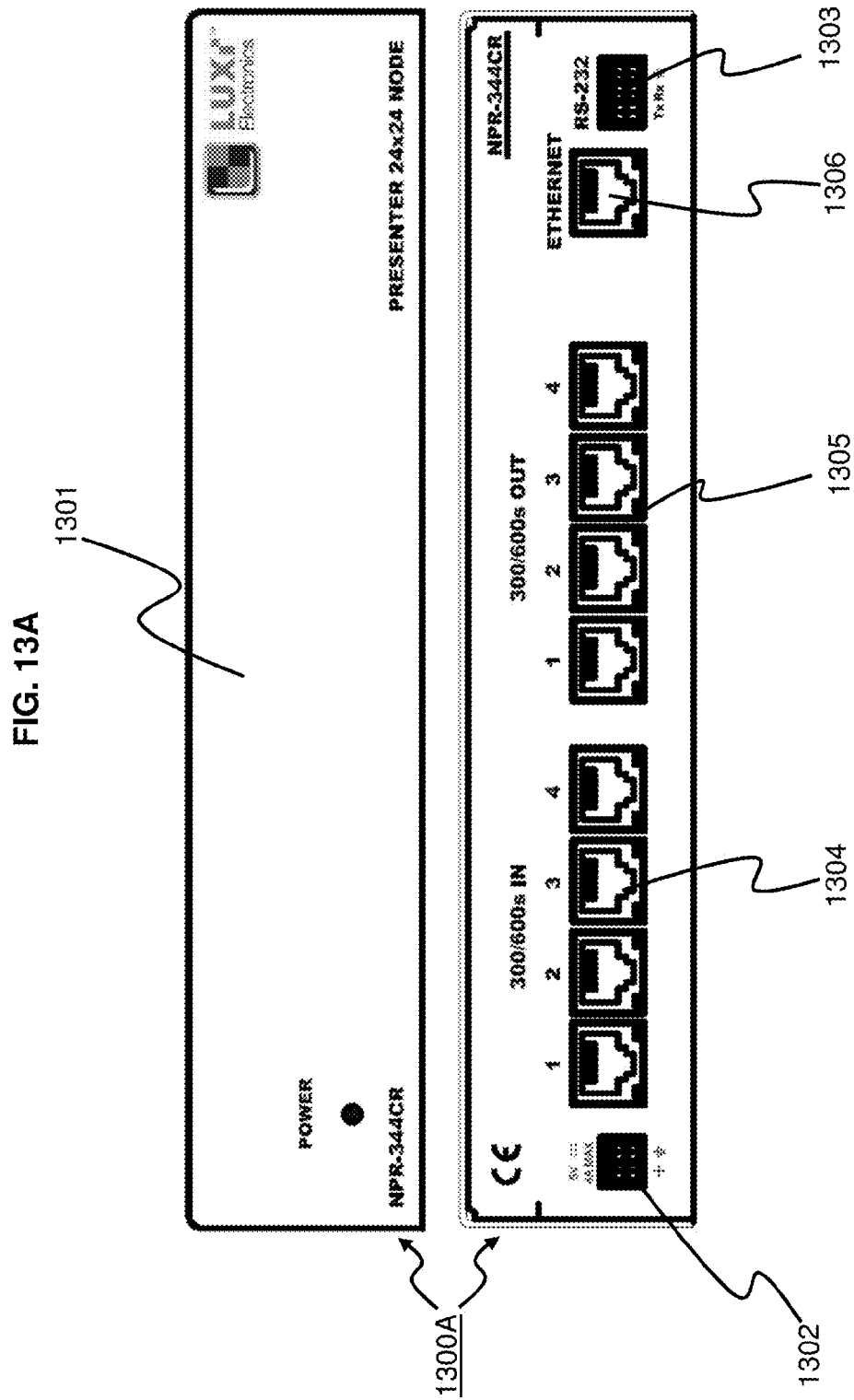
FIG. 13A schematically shows an example illustration of the front panel (top) and rear panel (bottom) of a Presenter node device.
Figure 13B:
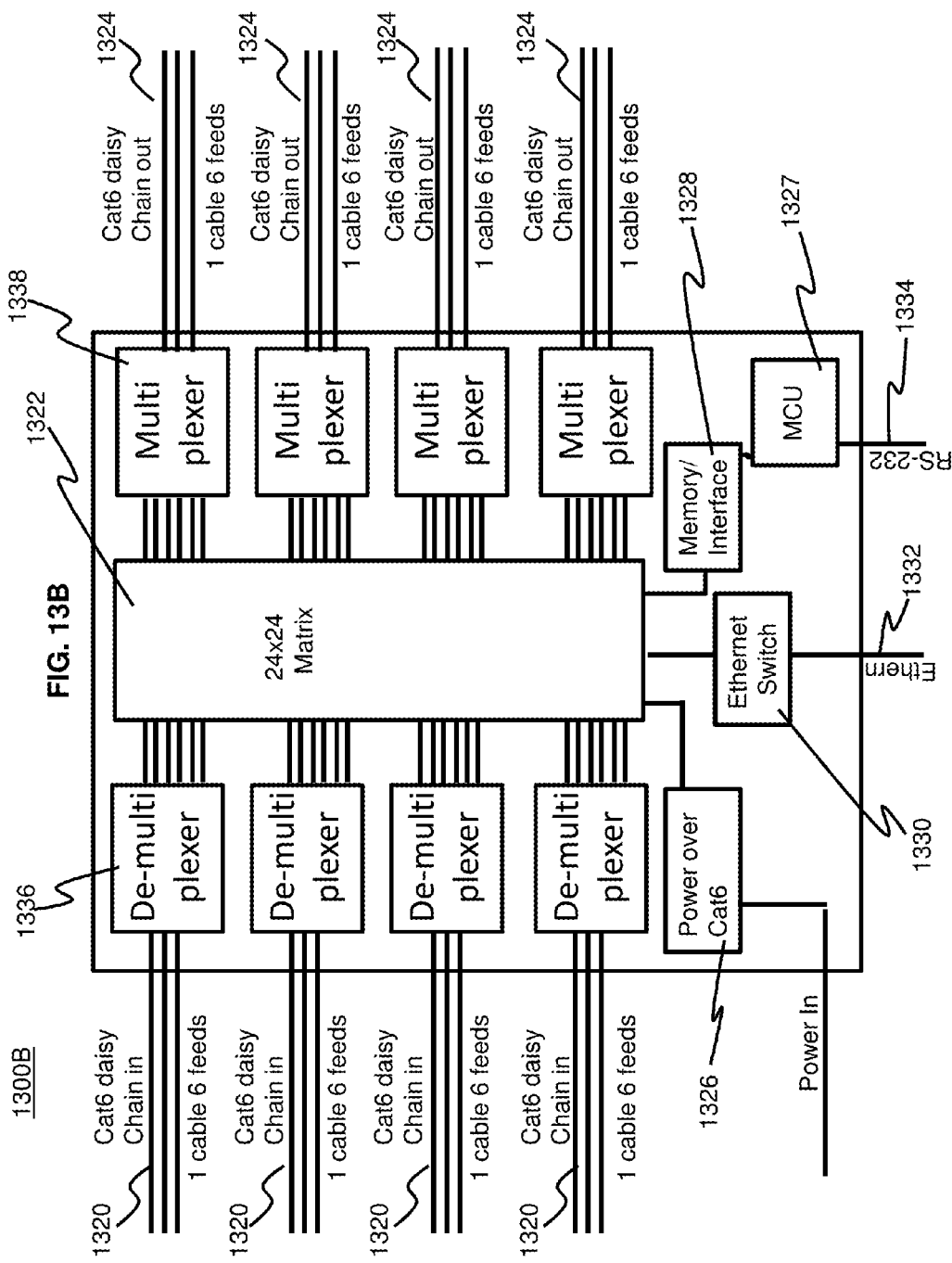
FIG. 13B schematically shows an example illustration of a Presenter node circuit block diagram.

Referring now to FIG. 13A and FIG. 13B schematically shown are embodiments of Presenter node (Nd) interfaces and the circuit block diagram of the same. In FIG. 13A representative interfaces are shown 1300A (front and back). The first front interface 1301 contains a power indicator. The second interface back contains a series of connectors (left to right) including but not limited to a female captive screw power input connector 1302 from which the optional external power supply is plugged into the node 1300A. Next are a series of inputs 1304 followed by outputs 1305 (e.g. shown for RJ45). In one embodiment the signal feed is 1 single feed per cable (100s). In other embodiments the signal feed is 3 signal feeds per cable (300s). In other embodiments the signal feed is 6 feeds per cable (600s). In still other embodiments the signal feed can be any multiple feeds per cable (e.g., 2, 4, 5, 10, 20, 30, 40, 50, 60, 70, 80, 90 and 100 or more). A network switch 1306 (e.g. Ethernet) may be present in embodiments that allows connection to the internet. Next is a female captive screw receiver connector 1303 from which the serial control signals in RS-232 or other signal (e.g. RS-485) format comes in and out and is transmitted through the daisy-chain to and from other Presenter node or Presenter transmitters and Presenter receivers and other Presenter nodes in the daisy-chain to control the signal flow in the system and other device functions.

Referring now to FIG. 13B schematically shown is an embodiment of a node circuit block diagram 1300B. In this configuration the signal inputs are shown (left) 1320 and outputs (right) 1324 (each shown with 6 signal feeds). Optional embodiment De-multiplexers 1336 can receive combined signals from each input cable or each twisted pair and decode it into multiple separated signals and feed the signal to any sized matrix 1322 (e.g. 24×24; 12×12; 48×48; 96×96; 256×256; multiplexmultiple up to 512×512 or other combinations). The signal can be routed to optional multiplexers 1338 for encoding several signals into one combined signal to each output cable or each twisted pair. In embodiments any input signal 1320 can be routed to any output 1324. In other embodiments other matrix switchers can be employed for accommodating more or less signals (e.g. 1×1; 1×2; 2×1; 2×2; 4×1; 1×4; 4×2; 2×4; 4×4; . . . ; all the way to 256×256 and 512×512 or other combinations). Power 1326 and the network switch, e.g. Ethernet 1330, 1332 also are connected to the Presenter node circuit board matrix 1322. A software program provides for the command query for signal routing from a microcontroller 1327 and memory interface 1328 which selects and controls the signal flow via serial data and control signals RS-232 1334 (or RS-485). Depending on the system type any of the input signals is output to any of the outputs from the node to downstream receivers, daisy-chains of receivers and other Presenter nodes.

Presenter Extender (Ex)

Figure 14:
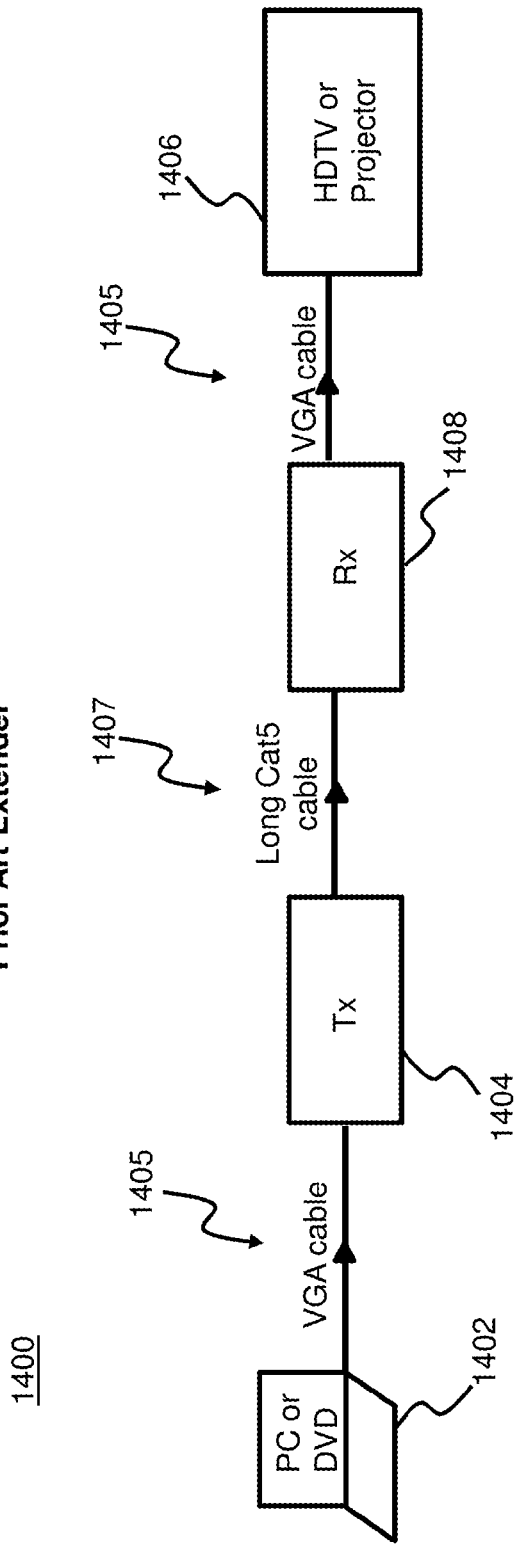
FIG. 14 schematically shows an example illustration of a prior art extender device.

Referring now to FIG. 14 and FIG. 15, schematically shown is a representative embodiment of a prior art Extender system 1400 for extending signal transmission range and a Presenter system 1500 with Presenter transmitters (Tx), Presenter receivers (Rx), and Presenter extenders (Ex). Referring first to FIG. 15, in this embodiment a signal feed signal comes from a source device 1502 and provides input via a cable 1505 to a Presenter transmitter (Tx) 1504 which is connected to multiple (e.g. two) Presenter extenders (Ex) 1506 in series followed by a Presenter receiver (Rx) 1508 and then to a display device 1510 via a cable 1505. Each device is connected together is series by a cable 1507. The cable 1505 from the signal device and to the display device can be a VGA, DisplayPort or HDMI cable. The Presenter system is completely scalable and can go virtually unlimited distance by daisy-chaining as many Presenter components (e.g. Presenter Tx, Nd, Ex and Rx as needed (multiple spans)). In contract in FIG. 14 the prior art system has a signal (left) from a source device 1402 (e.g. PC, DVD) over a standard cable 1405 to a standard transmitter (Tx) 1404 and thru a long cable 1407 (e.g. twisted pair cable), and connected to a standard receiver (Rx) 1408 and connected to the display 1406 via cable 1405. Since there's only one pair of the standard Tx and Rx is allowed in this prior art system, the maximum distance is limited to one span.

Figure 16A:
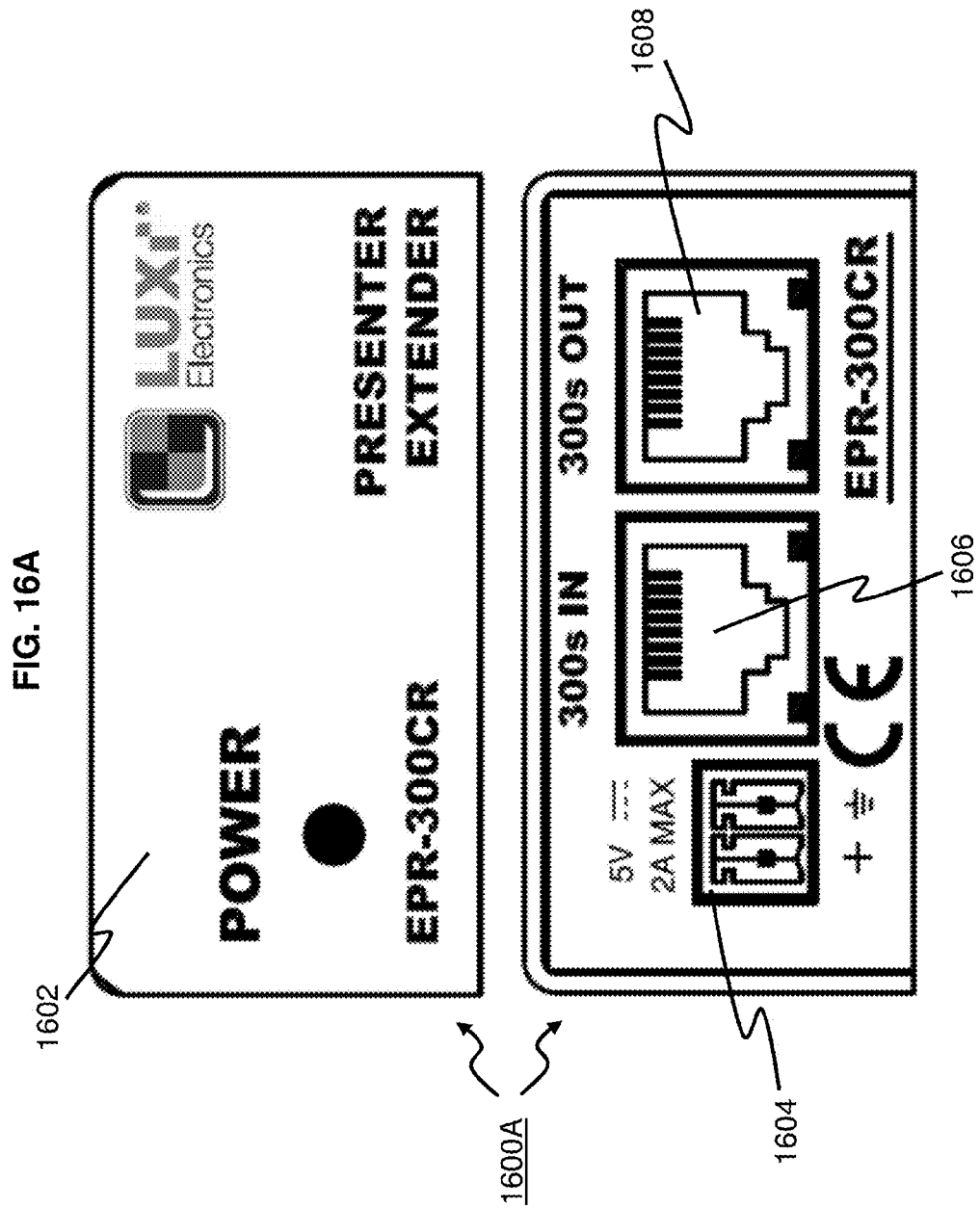
FIG. 16A shows an example illustration of the front panel (top) and rear panel (bottom) of a Presenter Ex (extender) device.
Figure 16B:
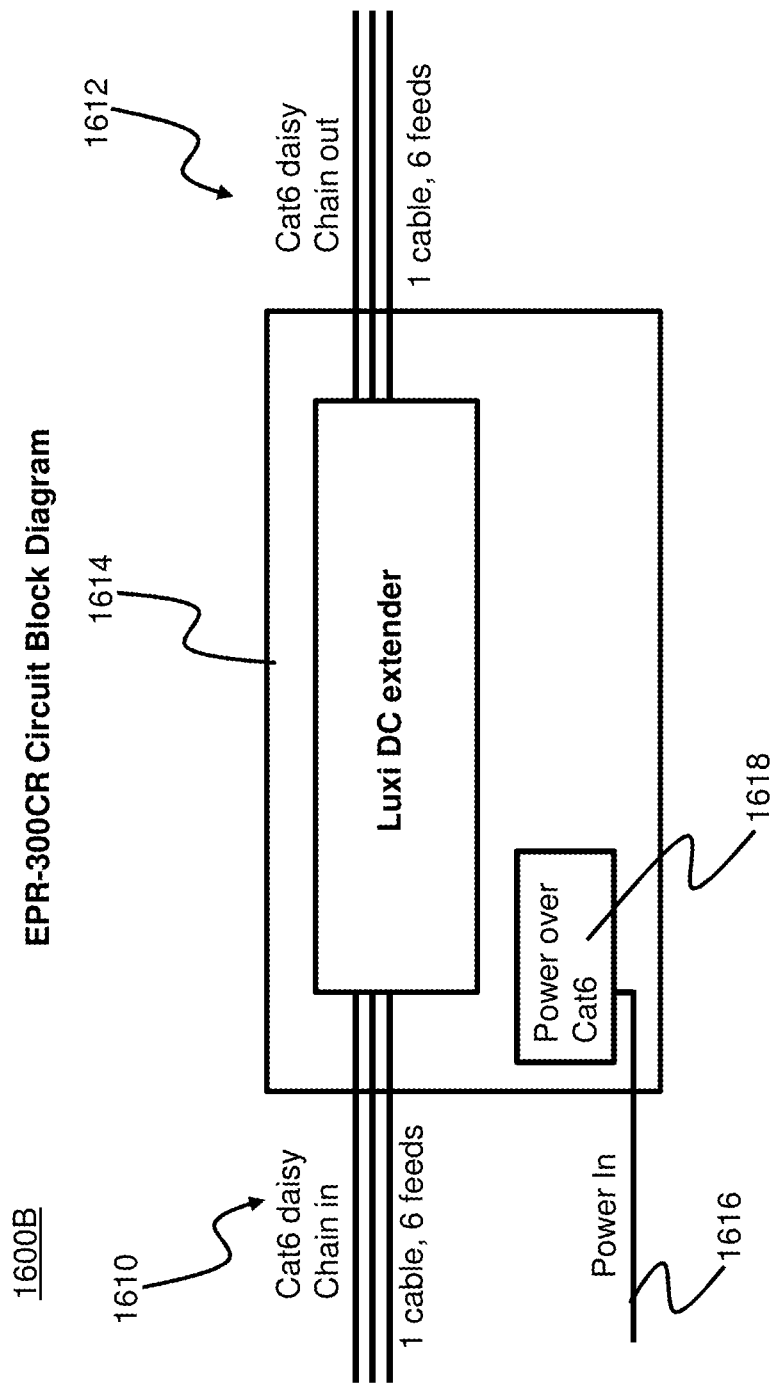
FIG. 16B shows an example illustration of an Ex (extender) circuit block diagram, the abbreviation "DC" in the illustration stands for Daisy-Chain.

Referring first to FIG. 16A and FIG. 16B schematically shown are Presenter extender (Ex) interfaces 1600A (Top: front and Bottom: back) and the internal circuit board 1600B of the same. Certain embodiment Presenter Ex have a front 1602 with power indicator and back with a female captive screw power input connector 1604 from which the optional external power supply is plugged into the Extender (Ex) and input 1606 and output 1608 for cable connectors (e.g. RJ45 connectors). In one embodiment the signal feed is 1 single feed per cable (100s). In other embodiments the signal feed is 3 signal feeds per cable (300s). In other embodiments the signal feed is 6 feeds per cable (600s). In still other embodiments the signal feed can be any multi feeds per cable (e.g., 2, 4, 5, 10, 20, 30, 40, 50, 60, 70, 80, 90 and 100 or more).

Referring now to FIG. 16B the Extender 1600B receives the digital signal via cable 1610 and equalizes and reconditions the signal via a DC (Daisy Chain) extender 1614, functioning as a repeater, then the extender sends the signal out to the next daisy chain device via cable 1612. Power 1618 can be provided from an external power supply to the circuit 1616 to operate the Presenter extender. In other embodiments power comes from the cable of daisy-chains of transmitters, receivers, and optionally nodes (remote power capability)

RJ45 Connector and Twisted Pair Pin/Pair Placement

Referring to FIG. 17 and FIG. 18 schematically shown is a representative prior art pin/pair placement and embodiment for a new RJ45 pin/pair configuration. In the new configuration shown in FIG. 18, the wires of each of the 4 twisted pairs of a twisted pair cable are terminated immediately next to each other with no separation or crossover, which improves the impedance characteristics, improves the common mode noise rejection and minimizes crosstalk between pairs. These improvements are even more significant in the high frequency of the digital video signals in multiple Gbps data rate. In FIG. 18 shown is the Luxi A configuration where the order of the pin/pairs for the two individual wires is as follows 1801: Pair 3 to pin 1 and pin 2; Pair 2 to pin 3 and pin 4; Pair 1 to pin 5 and pin 6; Pair 4 to pin 7 and pin 8 (left panel). For the Luxi B configuration the order of the pin/pairs for the two individual wires is as follows 1802: Pair 2 to pin 1 and pin 2; Pair 3 to pin 3 and pin 4; Pair 1 to pin 5 and pin 6; Pair 4 to pin 7 and pin 8 (right panel). The key is that no two individual wires are separated from any twisted pair and no wires from different pairs are crossed over Referring now to FIG. 17, schematically shown are prior art T568A (left panel) and T568B (right panel) pin/pair placements for comparison. For both A/B the two individual wires of either Pair 2 1701 (pins 3 and 6) or Pair 3 1702 (pins 3 and 6) are separated thus the impedance is changed from an optimal value; in addition, the crosstalk between pin 2 and 3, 3 and 4, 5 and 6, 6 and 7 would degrade the signal quality of all 4 pairs. For digital signal transmission this pin/pair configuration increases the crosstalk and impairs impedance characteristics due to high bandwidth requirements and is thus problematic.

Methods and Software for Video Audio Switching and Distribution

Referring now collectively to FIG. 19 schematically shown is a representative methods 1900, the left half shows the devices involved in each step; the right half shows the functions of each step. One or more signals from a source device 1907 (e.g. computer, tablet, smart phone) are input into a transmitter 1908 in function 1901. In some embodiments multiple transmitters can be connected in a daisy-chain configuration. The signal is converted in function 1902 into a common signal format (e.g. HDMI), then encoded into a digital signal for daisy-chain and can flow through the transmitter daisy-chain in function 1903. In most embodiments one of the transmitters is connected by a cable to a receiver which may be connected on one or more receivers in a daisy chain configuration. Each of the receivers 1909 can relay the signal to the downstream receiver in function 1904, and decode the signal by first extracting specific information from the signal path and then converting it to a display format in function 1906 for transmitting to a display device 1912. In some embodiment methods optional steps 1905 of controlling signal switching along the signal path can done by: (1) activating a selection button 1910 (e.g. labeled "Show Me"; can also be a switch, toggle, or other activator) located on a transmitter; (2) Inserting a remote control 1911 via connecting it to one of the transmitters 1908 or receivers 1909 in the daisy-chains of the system for control of the signal to a display device 1912. In function 1903, the transmitters can insert one (single-feed) or multiple (multi-feed) signals to the daisy chain while passing the rest of the signals to the next connected device. In function 1905, the receivers can accept one (single-feed) or multiple (multi-feed) signals from the daisy-chain and select which signal to be decoded for the local display while passing all signals to the next connected device in the chain. In specific embodiment methods for large systems Presenter nodes may be connected to provide a step for signal switching between transmitters, daisy-chains of transmitters and receivers and daisy-chains of receivers anywhere in the system creating a star-configuration (See FIG. 12).

Figure 21A:
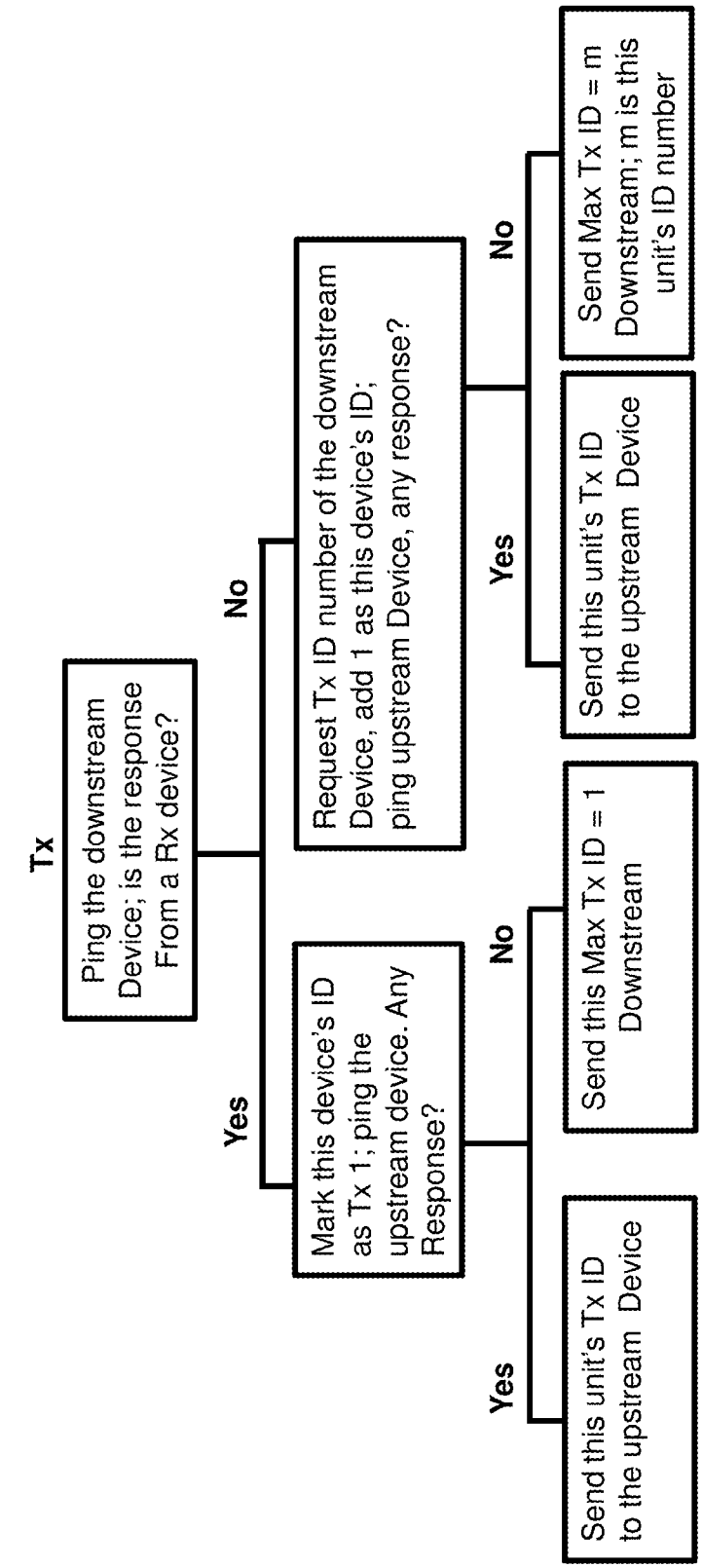
FIG. 21A schematically shows an example illustration of system configuration software flowchart for mapping Tx (transmitter) devices.

Referring specifically to FIG. 20, FIG. 21A and FIG. 21B, a representative initial system device mapping method and software flowcharts. The system mapping configuration 2000 occurs when the system is powered up, when a new device plugged in, or when a request is sent from the remote control. When one of these 3 conditions happens, each Presenter Tx 2002 and Presenter Rx 2003 or Presenter node (not shown) would ping the possible device located upstream and downstream in a daisy-chain. Based on the response to the pings, the direct connection between a Presenter Tx and Presenter Rx is set as the reference point 2001, then all Presenter Tx 2002 and Presenter Rx 2003 or Presenter node (not shown) devices are identified by the sequential numbers where the immediate Presenter Tx and Presenter Rx is No. 1, and the further away the Tx and Rx or node is from the reference point, higher the identification number. The numbers of the Presenter Tx and Presenter Rx or Presenter node furthest away from the reference point, M and N respectively, defines this system as an M×N system. Once the M and N are broadcasted throughout the daisy-chain, the signal routing commands described in the next section cannot contain the input number higher than M or output number higher than N. In other embodiments the devices would be identified by a variety of means including but not limited to ordering or mapping by numbers, names, and reference letters as would be apparent to one skilled in the art.

Referring now to FIG. 21C, schematically shown is a representative software scheme for performing routing 2108 control of video audio signals of the Presenter system. The routing command is m*ns; the m is the input signal number and the n is the output signal number; m cannot be bigger than the max Presenter Tx ID number M as identified in the steps in the last section; and n cannot be bigger than the max Presenter Rx ID number N. The "s" is an example of a switching command. When a m*ns command is broadcast in the daisy-chain, the Presenter Tx component with the matching number m will insert video and audio signals from the source device into the daisy-chain. All other Presenter Tx components will by-pass the signal in the daisy-chain. For Presenter Rx components the device with the identification number that matches the n will extract the signal from the daisy-chain for converting and sending to the display device. In other embodiments the system configuration software can be made to control bi-directional signal flow through a system. Since the routing command contains both input Presenter Tx ID number and output Presenter Rx ID number, it is independent from where this command is issued, thus the remote controller can be connected to any point in the system. Multiple routing commands can be issues in sequence; if there's a conflict between 2 commands, the later command take control. In other embodiments the control commands would be identified by the variety of means including but not limited to by numbers, names, and reference letters as would be apparent to one skilled in the art.

Presenter Duplexer

Referring now to FIG. 22, schematically shown is a representative Presenter video audio system featuring a Duplexer configured for bi-directional signal flow. In this embodiment system 2200 Duplexer components 2201 are connected in series a daisy-chain where the number is scalable with added units easily connected to the chain depending on installation requirements. Each Duplexer 2202 can receive one or more input signals from a source device 2201 (e.g. PC, DVD/Blu-Ray Player) and send out one or more output signals to a display device 2204 (e.g. HDTV, Projector). In some embodiments separate Duplexer daisy-chains are connected together via cable. Each series of Duplexer daisy-chains can both send and receive bi-directional signals 2203 along the chain and to other Duplexer daisy-chains. The signal from any source device in this system can be routed to any display device in this system in any direction. In certain embodiments a remote control device can be inserted into the system anywhere 2205 and a signal selection button or toggle/switch (e.g. labeled Show Me, or other designator) controls the signal selection allowing the signal to by-pass other Duplexers in the chain for routing to a display. In these and other embodiments a remote control can be added to any Duplexer throughout the system offering a second level of signal control. In still other embodiments the remote control can be connected via a wireless receiver which is connected to a Duplexer. The control signals, including but not limited to RS-485, RS-232, USB, IR (Inferred) and RF signals, can be routed to and from any devices in any direction.

Figure 23:
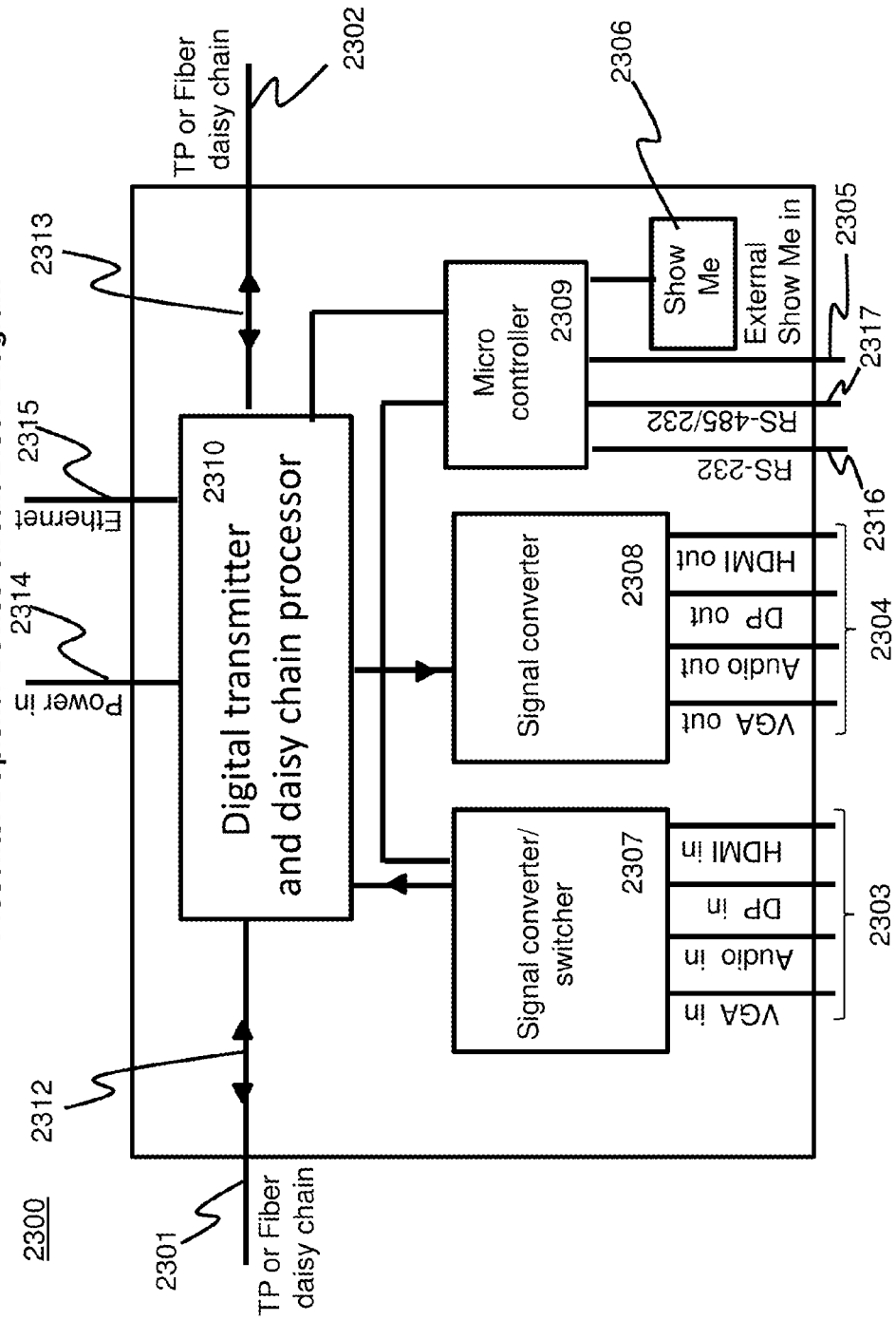
FIG. 23 schematically shows an example illustration of a Presenter Duplex device circuit block diagram.

Referring now to FIG. 23, schematically shown is a representative embodiment Duplexer circuit board 2300. In this embodiment the circuit board in configured to receive a bi-directional signal 2312 from the series of daisy-chain of Duplexer components or source devices. In embodiments the input signal from a cable 2301 is a bi-directional signal 2312 flows into a digital transmitter 2310 which inserts signal information into the signal path for extraction and output from a daisy-chain processor 2310 for output as a bi-directional signal 2313 to downstream Duplexers 2302 of the daisy-chain or to a signal converter/distributer 2308 and then to a plurality of signal output connectors. Power input 2314 and two-way network switch, e.g. Ethernet 2315 input signals also enter the digital transmitter 2310 and then the daisy chain processor 2310. A plurality of input signals 2303 from a source device including VGA, audio, DisplayPort, HDMI, and optionally DiiVA (not shown) flows into an integrated circuit (IC) signal converter/switcher 2307 where the signal is converted and selected for transmission to the daisy chain processor 2310. The circuit board also has the plurality of signal converter/switcher connected to a signal converter/distributer 2308 where outputs for VGA, audio, DisplayPort, HDMI, and optionally DiiVA (not shown) via connectors 2304. In other embodiments other switchers can be employed for accommodating more or less signals (e.g. 1×1; 1×2; 2×1; 2×2; 4×1; 1×4; 4×2; 2×4; 4×4; . . . ; all the way to 256×256, or other combinations). In some embodiment the Duplex only has one HDMI input and one HDMI output and has no built in switcher, splitter or scaler.

Signal control software regulates a microcontroller 2309 and memory interface (not shown) which receives control signals (e.g. RS232) 2317 that from an external source that comes in and out for overall control of signal flow, priority and volume through the daisy-chain to and from other Duplexers to control the signal flow in the system and other device functions. In some embodiments a universal serial bus (USB) input 2316 is present to provide input signals from a USB device. In many embodiments the signal selection input 2305 and control button 2306 feeds into the microcontroller.

In other embodiments each Presenter component and circuitry (e.g. Transmitter (Tx), Receiver (Rx), Node (Nd), Extender (Ex) and Duplexer) can be integrated into other video audio devices including but not limited to source devices (e.g. computer, DVD/Blu-ray player, tablet, smart phone) display devices (e.g. HDTC, projector) or other auxiliary devices (e.g. printers, controllers, smart cables, satellite set-top box (STB), AV receiver/transmitter, or other like devices).

All of the devices and methods disclosed and claimed in this application can be made and executed without undue experimentation in light of the present disclosure. While the devices and methods of this invention have been described in terms of preferred embodiments, it will be apparent to those of skill in the art that variations may be applied to the devices and methods for components and in the steps or in the sequence of steps of the method described in this application without departing from the concept, spirit and scope of the invention. More specifically, it will be apparent that certain materials or components which are both related may be substituted for making the devices or accomplishing the methods the agents described in this application while the same or similar functionality would be achieved. All such similar substitutes and modifications apparent to those skilled in the art are deemed to be within the spirit, scope and concept of the invention as defined by the appended claims.

What is claimed is:

1. A method for digital video audio signal switching and distribution comprising:
    providing at least one local input signal wherein the signal path flows from the video audio devices into and through a scalable daisy chain of the transmitter and receivers;
    converting each input signal into a daisy chain signal format using encoder circuits on the circuit board of each of the transmitter or transmitters;
    optionally selecting between the more than one signals with a switcher, configured on the circuit board of each transmitter;
    inserting input signals into the signal path, wherein a daisy chain processor configured on the circuit board of the transmitter inserts signals into the signal path to flow through the transmitter or chain of transmitters;
    transmitting the inserted signal by linking at least one of the transmitters to a receiver or a daisy chained connected series of receivers, wherein the signal path flows from an individual transmitter to an individual receiver and then through the chain of receivers; and
    extracting signals for display on a display device wherein a daisy chain processor configured on a circuit board of the receiver that extracts selected signals;
    converting the extracted signals to at least one signal format which can be shown on a display unit by decoder circuits on the circuit board of each receiver; and
    displaying the signals from the receivers on at least one display unit.

2. The method of claim 1, further comprising:
    controlling signal switching and distribution between the chain of transmitters and the chain of receivers, wherein each of the at least one transmitters contains at least one selection button, whereby activating a selection button on a transmitter controls the selection and distribution of the signal through the transmitter and receiver or chains of transmitters and receivers for relay to a display unit, wherein the last activated selection button controls the signal selection for display; displaying the signals from the receivers on at least one display unit.

3. A digital video audio signal switching and distribution system comprising:
    at least one transmitter, wherein each transmitter is configured to receive signals from a video audio source device and to insert the signal into a daisy chain series of transmitter/transmitters and receiver/receivers; each transmitter further comprising a first, a second and a third interface and a circuit board;
    the first interface of the transmitter further comprising an input connector to connect to other upstream transmitters or receivers in the daisy chain series via a cable;
    the second interface of the transmitter further comprising an output connector to connect to other downstream receivers or transmitters in the daisy chain series via a cable;
    the third interface of the transmitter further comprising at least one input connector to connect to a local video audio source device via a cable;

the circuit board of each of the transmitter/transmitters further comprising a daisy chain processor for managing the upstream and downstream daisy chain signals, and the local signals;

the daisy chain processor of each transmitter further comprising alternative configurations to:

(a) pass on each of the at least one daisy chain signals without decoding through the daisy chain series of transmitter/transmitters and receiver/receivers if there is no need to insert a local signal; if a local signal needs to be inserted, an encoder will convert the local standard signal format to the daisy chain signal format, and the daisy chain processor will replace one of the upstream daisy chain signals with this encoded local signal and send to downstream daisy chain devices; or (b) decode each of the at least one upstream daisy chain signals into the local signal format, and wherein a switcher selects between the decoded daisy chain signal and any local signal, and such selected signals will be encoded into the daisy chain signal and will be sent to the downstream daisy chained devices;

at least one receiver, wherein each receiver is configured to extract the signals from a daisy chain series of transmitter/transmitters and receiver/receivers for local displays; each receiver further comprising a first, a second and a third interface and a circuit board;

the first interface of the receiver further comprising an input connector to connect to other upstream transmitters or receivers in a daisy chain series via a cable the second interface of the receiver further comprising an output connector to connect to other downstream receivers or transmitters in a daisy chain series via a cable;

the third interface of the receiver further comprising an output connector for sending a selected signal to a sink device;

the circuit board of each of the receiver/receivers further comprising a daisy chain processor for managing the upstream and downstream daisy chain signals, and the local signals for displays the daisy chain processor of each receiver further comprising alternative configurations to:

(a) pass on each of the at least one daisy chain signals without decoding through the daisy chain series of transmitter/transmitters and receiver/receivers; if a daisy chain signal is needed for local display, the daisy chain processor will split that signal out, a decoder will convert that daisy chain signal into standard local signal and will send the signal to a local display or sink; or (b) decode each of the at least one upstream daisy chain signals into the local signal format, and wherein a splitter will split the this signal into at least two paths, and will send one of them to a local display or sink, and the other to an encoder to be converted to daisy chain signal to be sent to the downstream daisy chained devices.

4. The video audio signal switching and distribution system of claim 3, further comprising at least one cable for connecting between adjacent transmitters or receivers.

5. The video audio signal switching and distribution system of claim 3, further comprising at least one input selection button on each of the at least one transmitters, whereby activating a selection button on a transmitter selects the signal directed from that transmitter to proceed through all of the transmitters and all of the receivers to an at least one display unit, and wherein the last activated selection button controls the signal flow path.

6. The video audio signal switching and distribution system of claim 3, further comprising at least one remote control unit positioned at one or more of a plurality of positions within the connected series of daisy chain series of transmitters and daisy chain series of receivers providing for a second level of control for signal routing to the at least one display unit.

7. The video audio signal switching and distribution system of claim 3, wherein each of the transmitters and receivers have an Ethernet connection for accessing the internet, wherein any of the transmitters and receivers can serve as internet access points for any video audio device connected to a transmitter of the system, and whereby all connected video audio devices connected to a transmitter of the system would have internet access via internet signals that are transmitted through the connected series of daisy chain series of transmitters and daisy chain series of receivers.

8. The video audio signal switching and distribution system of claim 3, wherein there is a plurality of transmitters and one receiver.

9. The video audio signal switching and distribution system of claim 3, wherein there is one transmitter and a plurality of receivers.

10. The video audio signal switching and distribution system of claim 3, wherein there is a plurality of transmitters and a plurality of receivers.

11. The video audio signal switching and distribution system of claim 3, wherein each of the transmitters contains a circuit board configured for receiving a plurality of input signal formats, the circuit board further comprising;

a VGA/audio to HDMI scaler configured to receive a VGA and audio input signal;

a DisplayPort to HDMI converter configured to receive a DisplayPort input signal; and a HDMI switcher configured for selecting among input signals for distribution to a digital transmitter.

12. The video audio signal switching and distribution system of claim 11, wherein the local source signals is a signal in a format selected from the group consisting of VGA/audio, HDMI, DisplayPort, and DiiVA.

13. The video audio signal switching and distribution system of claim 3, wherein each of the at least one receiver further comprises:

a circuit board configured for extracting daisy chain signals, decoding them into local signals, and scaling them into signal formats selected from the group consisting of VGA/audio, HDMI, DisplayPort and DiiVA.

14. The video audio signal switching and distribution system of claim 4, wherein the type of cable used to connect transmitter, receiver is selected from the group consisting of a coaxial cable, a twisted pair cable, and an optical fiber cable.

15. The video audio signal switching and distribution system of claim 3, wherein the number of the at least one transmitters, extenders or receivers of the system are scalable, wherein additional transmitters, extenders or receivers can be added to the daisy chain series to cover any longer transmission distance.

16. The video audio signal switching and distribution system of claim 3, wherein each of the transmitters, receivers and nodes are connected via a RJ45 male and female connector pin/pair type A configuration for eight-conductor quad twisted-pair cabling, the pin/pair A configuration further comprising:

a set of eight pins configured to receive individual wires from four twisted pairs, wherein none of the two individual wires from each of the four twisted pairs are separated by an intervening individual wire from another twisted pair; and wherein the pin assignments is as follows from all the pin and pair numbering combinations;

pin 1 and 2 are for the first and second wire of twisted pair 3;

pin 3 and 4 are for the first and second wire of twisted pair 2;

pin 5 and 6 are for the first and second wire of twisted pair 1; and pin 7 and 8 are for the first and second wire of twisted pair 4, whereby the common-mode noise rejection and impedance characteristics are enhanced and crosstalk between wires is reduced, especially in high frequency.

17. The RJ45 male and female connector pin configuration of claim 16 wherein the pin outs are alternately configured in a type B configuration wherein pin 1 and 2 are for the first and second wires of twisted pair 2 and wherein pin 3 and 4 are for the first and second wires of twisted pair 3.

18. The video audio signal switching and distribution transmitter of claim 11, further comprising a source signal switcher wherein the switcher is selected from the group consisting of a 2 signal by 1 signal switcher, a 3 signal by 1 signal switcher, a 4 signal by 1 signal switcher, and a multiple signal by 1 signal switcher.

19. The video audio signals switching and distribution system of claim 3, wherein the video, audio, Ethernet and control signals can be bi-directional.

20. The system of claim of claim 3, further comprising at least one node configured with circuitry to receive at least one signal from any connected transmitter or daisy chain of transmitters and to output the at least one signal to any connected receiver or daisy chain of receivers.

21. The transmitter of claim 11, or receiver of claim 13, or node of claim 20, wherein the circuit board can take power from other transmitters, receivers, duplexers or nodes in the video audio signal switching and distribution system; and whereby no separate external power supply is required.

22. The system of claim of claim 3 further comprising at last one extender for equalizing and reconditioning signals to maintain signal integrity over long distances, whereby at least two signals from an upstream daisy chain device in a series of transmitters, receivers and/or nodes are repeated to the next downstream daisy chain device in a series of transmitter, receiver and/or node in the daisy chain series of transmitters, receivers and/or nodes.

23. The method ot claim 1, further comprising the steps of:
providing the signal with a twisted pair cable terminated with a male RJ45 connector having a twisted wire pair configuration of a RJ45 male and female connector pin/pair type A configuration for eight-conductor quad twisted-pair cabling, the pin/pair A configuration further comprising:

a set of eight pins configured to receive individual wires from four twisted pairs, wherein none of the two individual wires from each of the four twisted pairs are separated by an intervening individual wire from another twisted pair; and wherein the pin assignments is as follows from all the pin and pair numbering combinations;

pin 1 and 2 are for the first and second wire of twisted pair 3;

pin 3 and 4 are for the first and second wire of twisted pair 2;

pin 5 and 6 are for the first and second wire of twisted pair 1; and pin 7 and 8 are for the first and second wire of twisted pair 4, whereby the common-mode noise rejection and impedance characteristics are enhanced and crosstalk between wires is reduced, especially in high frequency;

or wherein the pin outs are alternately configured in a type B configuration wherein pin 1 and 2 are for the first and second wires of twisted pair 2 and wherein pin 3 and 4 are for the first and second wires of twisted pair 3.

* * * * *